(12) United States Patent
Kiss et al.

(10) Patent No.: US 7,570,923 B2
(45) Date of Patent: Aug. 4, 2009

(54) I/Q COMPENSATION OF FREQUENCY DEPENDENT RESPONSE MISMATCH IN A PAIR OF ANALOG LOW-PASS FILTERS

(75) Inventors: Peter Kiss, Morristown, NJ (US); Vladimir Prodanov, New Providence, NJ (US)

(73) Assignee: Agere Systems Inc., Allentown, PA (US)

( * ) Notice: Subject to any disclaimer, the term of this patent is extended or adjusted under 35 U.S.C. 154(b) by 925 days.

(21) Appl. No.: 10/848,187

(22) Filed: May 18, 2004

(65) Prior Publication Data

US 2005/0260949 A1 Nov. 24, 2005

(51) Int. Cl.
*H04B 17/00* (2006.01)
(52) U.S. Cl. .............. 455/67.14; 455/67.11; 455/67.16; 455/63.1; 455/115.1; 455/115.2; 455/226.1
(58) Field of Classification Search ................ 455/63.1, 455/67.11, 67.13–67.16, 115.1–115.4, 226.1–226.3, 455/323–324, 280, 283–284, 326, 295–296, 455/313–315, 317–318, 423–425; 375/371–376, 375/322, 316, 326, 147, 235
See application file for complete search history.

(56) References Cited

U.S. PATENT DOCUMENTS

| | | | |
|---|---|---|---|
| 6,009,317 A * | 12/1999 | Wynn | 455/296 |
| 6,265,949 B1 * | 7/2001 | Oh | 332/103 |
| 6,590,480 B2 * | 7/2003 | Matsuda | 335/78 |
| 6,744,829 B1 * | 6/2004 | Mohindra | 375/343 |
| 7,035,341 B2 * | 4/2006 | Mohindra | 375/261 |
| 7,130,359 B2 * | 10/2006 | Rahman | 375/316 |
| 7,181,205 B1 * | 2/2007 | Scott et al. | 455/423 |
| 7,187,725 B2 * | 3/2007 | Song et al. | 375/316 |
| 2005/0008107 A1 * | 1/2005 | Brown | 375/343 |

* cited by examiner

*Primary Examiner*—Tuan A Tran

(57) ABSTRACT

Frequency dependent I/Q imbalance in real I/Q filter pairs compensation may be performed using a simple compensation module, placed in the receiver/transmitter chain, with a gain adjustment coefficient and a delay adjustment coefficient. The gain adjustment coefficient may be determined by amplitude measurements conducted at a selected frequency near the center of the band-pass region of the filters. The delay adjustment coefficient may be determined by phase measurements conducted at a selected frequency near the edge of the band-pass region of the filters. Statistical analysis may be used to determine types of real filters that are better suited for the compensation method and to select the test frequencies that should be used.

62 Claims, 18 Drawing Sheets

FIG. 17

| rms IMR [dB] fp=7, fg=5 [MHz] | | | TRANSFER FUNCTION | | | |
|---|---|---|---|---|---|---|
| | | | Butterworth | | Chebyshev | |
| | | | median | 3σ | median | 3σ |
| Cascade | leakage | | 33.7 | 21.5 | 28.0 | 17.5 |
| | corrected | | 43.4 | 33.3 | 30.1 | 19.6 |
| | Δ | | 9.7 | 11.8 | 2.1 | 2.1 |
| Ladder | leakage | | 35.2 | 25.7 | 32.7 | 21.8 |
| | corrected | | 46.1 | 35.0 | 38.5 | 26.9 |
| | Δ | | 10.9 | 9.3 | 5.8 | 5.1 |

TOPOLOGY

1700

I/Q COMPENSATION OF FREQUENCY DEPENDENT RESPONSE MISMATCH IN A PAIR OF ANALOG LOW-PASS FILTERS

FIELD OF THE INVENTION

The present invention concerns compensation of matched two-path real filter pairs. More specifically, the present invention concerns (I/Q) compensation of frequency dependent response mismatch for a pair of analog (low) pass filters.

BACKGROUND

Multiple channels of data can share a single transmission medium, but a receiver may desire data from one channel. Therefore, to isolate the desired channel for processing, transceivers typically perform at least three operations on the received signal: (1) the undesired channels are filtered out; (2) the desired channel is "shifted" to dc, where it can be processed; and (3) the signal is amplified. The order of the operations depends on the design of the transceiver. Shifting a signal may be accomplished by mixing the signal with a local oscillator signal.

In superheterodyne transceivers, the input signal (e.g., a Radio Frequency ("RF") signal) is amplified and filtered. Then, the filtered RF signal is shifted to an intermediate frequency ("IF") where it is passed through a highly selective filter and substantially amplified before it is shifted to dc for processing.

Direct conversion transceivers use techniques to avoid having to use an IF, thereby saving power, cost and allowing for a smaller physical design for some applications (e.g., mobile communications devices). A part of an exemplary direct conversion (zero-IF) receiver 100 is illustrated in FIG. 1. The receiver 100 includes an antenna (A) 102, a low-noise amplifier (LNA) 104, two mixers 106, 108, two real low-pass filters (LPFs) 110, 112, two analog-to-digital converters (ADCs) 114, 116, and a Fast Fourier Transform (FFT) module 118. The FFT module 118 may be included, e.g., as part of an exemplary Orthogonal Frequency Division Multiplexer (OFDM) Digital Signal Processor (DSP), used in the application of 802.11a, 802.11g or another OFDM standard.

Antenna 102 receives signal, $x_{IN}$, which is fed to the input of LNA 104. LNA 104 amplifies signal $x_{IN}$ and outputs signal $x_A$. Signal $x_A$ is input in parallel to each of the mixers 106, 108. Mixer 106 mixes signal $x_A$ with local oscillator signal, $lo_1$ ("I") and outputs signal $x_1$. Mixer 108 mixes signal $x_A$ with local oscillator signal, $lo_2$ ("Q") and outputs signal $x_2$. The two local oscillator signals, $lo_1$ ("I") and $lo_2$ ("Q") are quadrature related (separated in phase by 90°). Signal $x_1$ is filtered by low-pass filter 110, outputting filtered signal $y_1$. Signal $x_2$ is filtered by low-pass filter 112, outputting filtered signal $y_2$. Filtered signals $y_1$, $y_2$, are input to ADCs 114, 116, respectively, which sample the analog filtered signals $y_1$, $y_2$ at a sampling frequency, $f_s$. The digital outputs from ADCs 114, 116 are input to FFT 118 which processes and reforms the transmitted signal in the digital domain.

An exemplary zero-IF transmitter (TX) chain 200 is shown in FIG. 2. Transmitter (TX) chain 200 starts with a DSP 202, followed by a pair of digital-to-analog converters (DACs) 204, 206, a pair of LPFs 208, 210, a mixer/LO block 212, a power amplifier (PA) 214, and an antenna 216. DSP 202 generates and outputs pairs of digital quadrature signals, which are input to the pair of DACs 204, 206. The DACs 204, 206, operating at a sample rate $f_s$, convert the digital quadrature signals to analog quadrature signals. The analog quadrature signals are input to the pair of real low pass filters 208, 210. The real low pass filter pair 208, 210 filter the analog signals, and the filtered analog signals are input to the mixer/local oscillator block 212. Mixer/lo block 212 mixes LPF 208 output signal with $lo_1$ (I), mixes LPF 210 output signal with $lo_2$ (Q), and combines the two mixed signals. The output from mixer/lo block 212 is fed to a power amplifier 214, which amplifies the signal prior to transmission over antenna 216.

The two quadrature paths (I path and Q path), corresponding to the I and Q local oscillator signals, allow the direct conversion receiver/transmitter to avoid having to use an IF. Unfortunately, the characteristics of direct conversion receivers, transmitters, and transceivers are not ideal.

I/Q mismatch (sometimes referred to as I/Q errors) causes I/Q imbalance (sometimes referred to as I/Q leakage). I/Q imbalance in receivers, transmitters, and transceivers, an area of concern to the present invention, shall now be described. Main contributors of the RX 100 chain's (FIG. 1) I/Q imbalance are the gain error ($\delta G_1$) 105 of the mixers (106, 108), the phase error ($\delta P_1$) 107 in the local oscillator signals, the gain ($\delta G_2(\omega)$) 109 and phase ($\delta P_2(\omega)$) 111 mismatch between the LPF's (110,112) transfer functions, and the gain error ($\delta G_3$) 115 between the ADCs (114,116).

Slight differences in the components of the mixers 106, 108 may contribute to the gain error ($\delta G_1$) 105. Slight differences in the I/Q relationship of the $lo_1$ and $lo_2$, and the I and Q signals that are not exactly in quadrature may cause phase error ($\delta P_1$) 107. Component mismatches between filters 110, 112 may cause the gain ($\delta G_2(\omega)$) 109 and phase ($\delta P_2(\omega)$) 111 errors. If the components of filters 110, 112 are not perfectly matched, (i.e., if the transfer functions do not match ($H_1(\omega) \neq H_2(\omega)$, where $H_1(\omega)$ represents the transfer function for LPF 110 and $H_2(\omega)$, represents the transfer function for LPF 112)) then a non-zero transfer function $H_{df}(\omega)$, contributes to a leaked (undesired or difference) output component. Even when the filters are fabricated at the same time and on the same integrated chip, component mismatch of 0.2% to 0.5% or even larger may still occur. A parallel model of an imperfect low-pass filtering operation is illustrated in FIG. 3. The top branch represents the common component, $h_{cm}$, of $H_1(\omega)$ and $H_2(\omega)$, which produces the desired output. The bottom branch represents the difference component, $h_{df}$, between $H_1(\omega)$ and $H_2(\omega)$, which produces the leaked signal. Returning to FIG. 1, slight differences in the components of the ADCs 114, 116 may contribute to the gain error ($\delta G_3$) 115.

The I/Q imbalance contribution of gain and phase errors can be modeled as a two-input two-output linear network with some inter-coupling coefficients. These simple models can be individually applied to each block of mixers/lo, LPFs and ADCs, as shown in error model representations 120, 122, and 124, respectively of FIG. 1. Note that the LPF error model representation coefficients are a function of frequency, which significantly complicates the modeling and compensation.

Main contributors of the TX 200 chain's (FIG. 2) I/Q imbalance are the gain error ($\delta G_1$) 211 of the mixer/lo block 212, the phase error ($\delta P_1$) 213 in the local oscillator signals, the gain ($\delta G_2(\omega)$) 207 and phase ($\delta P_2(\omega)$) 209 mismatch between the LPF's (208, 210) transfer functions, and the gain error ($\delta G_3$) 205 between the digital-to-analog data converters (204, 206). The I/Q imbalance contribution of gain and phase errors can be modeled as a two-input two-output linear network with some inter-coupling coefficients. These simple models can be individually applied to each block of mixers/lo, LPFs and DACs, as shown in error model representations 218, 220, and 222, respectively of FIG. 2. Note that the LPF error model representation coefficients are a function of frequency, which significantly complicates the modeling and compensation.

FIG. 4 illustrates the concepts of leakage and compensation which may be applied to I/Q receivers, transmitters and transceivers using two-input two-output leakage and correction models.

In mathematical terms a leakage stage 404 may be described as:

$$\vec{y} = A_{leak} \times \vec{x} \quad (1)$$

where $\vec{y} = [y_1, y_2]^T$ (output), $\vec{x} = [x_1, x_2]^T$ (input) and $A_{leak}$ (model) are given in FIG. 4. The resulting image rejection ratio (IMR) corresponding to the leakage stage 404 can be calculated by:

$$IMR \cong 10 \log_{10} \left| \frac{(1 + \delta G^2 + 2\delta G \cos \delta P)}{(1 + \delta G^2 + 2\delta G \cos \delta P)} \right| [dB]$$

The concept of IMR shall now be described. An imperfect quadrature signal can be modeled in the phase domain as two rotating phasors with $\omega_0$ angular frequency by $(\pi/2-\phi)$ apart, and with $A_I$ and $A_Q$ magnitudes. The frequency domain representation of this two-path signal contains a desired component at $\omega_0$ and a leakage (undesired) component at $-\omega_0$. The image rejection ratio (IMR) may be used as a representation for the degree of I/Q imbalance. The IMR would be infinitely large (desirable) if the gain imbalance $\gamma = A_I/A_Q$ was unity and the phase imbalance $\phi$ was zero; such an IMR (corresponding to leakage stage 404) would be represented in the $A_{leak}$ model representation with $\delta G=1$ and $\delta P=0$.

The concept of I/Q imbalance compensation is straightforward: whatever "leaks" due to I/Q mismatch can be cancelled by deliberately "leaking back" the same amount. To compensate for this I/Q leakage, first, the coefficients of the error matrix $A_{leak}$ should be estimated using off-line or on-line estimation methods. Off-line estimation methods refer to test methods conducted while normal operation of the receiver/transmitter is not in progress, e.g., normal operations have been suspended to inject test signals into the LPF pair and measure the response of those test signals. On-line estimation methods refer to estimation methods which may be conducted during normal receiver/transmitter operation, without suspending the receiver/transmitter normal functions.

Some known off-line estimation methods use sets of one or multiple test frequencies (tones) sent simultaneously into the I/Q chain; measurements are performed by the DSP (FFT) block at the output. Due to the frequency dependency of the LPFs, testing in these known methods is performed over a large number of sets of frequencies (tones) to determine the error matrix $A_{leak}$. Other known compensation methods use test-signal based adaptive tuning algorithms, e.g., where testing is repeated iteratively and the $A_{leak}$ may be gradually adjusted and allowed to converge over time. Examples of known off-line estimation methods are included in the following references:

J. K. Cavers and M. W. Liao, "Adaptive compensation for imbalance and offset losses in direct conversion transceivers," *IEEE Transactions on Vehicular Technology*, Vol. 42, No. 4, pp. 581-588 (November 1993);

J. P. F. Glas, "Digital I/Q imbalance compensation in a low-IF receiver," *Proceedings of the IEEE Global Communications Conference*, pp. 1461-1466 (1998);

F. E. Churchill, G. W. Ogar, and B. J. Thompson, "The correction of I and Q errors in a coherent processor," *IEEE Transactions on Aerospace and Electronic Systems*, Vol. AES-17, pp. 131-137 (January 1981);

K. Pun, J. Franca, and C. Azeredo-Leme, "Wideband digital correction of I and Q mismatch in quadrature radio receivers," *Proceedings of the IEEE International Symposium on Circuits and Systems*, pp. V. 661-V. 664 (2000);

X. J. Tao, "Frequency dependent I/Q calibration," *Technical memorandum, Agere Systems*, (Oct. 9, 2001); and L. Der and B. Razavi, "A 2-GHz CMOS image-reject receiver with LMS calibration," *IEEE Journal of Solid-State Circuits*, Vol. 38, No. 2, pp. 167-175 (February 2003).

Still other known compensation methods which avoid training (test) signals use blind, on-line adaptive methods to estimate and correct the I/Q imbalance. Examples of known on-line estimation methods are included in the following references:

M. Valkama, M. Renfors, and V. Koivunen, "Advanced methods for I/Q imbalance compensation in communication receivers," *IEEE Transactions on Signal Processing*, Vol. 49, No. 10, pp. 2335-2344 (October 2001);

L. Yu and W. M. Snelgrove, "A novel adaptive mismatch cancellation system for quadrature IF radio receivers," *IEEE Transactions on Circuits and Systems-II: Analog and Digital Signal Processing*, Vol. 46, No. 6, pp. 789-801 (June 1999); and K. Pun, J. Franca, and C. Azeredo-Leme, "The correction of frequency-dependent I/Q mismatches in quadrature receivers by adaptive signal separation," *Proceedings of the International Conference on ASIC*, pp. 424-427 (2001).

Once $A_{leak}$ is estimated, a correction matrix $A_{corr}$ can be found by $$A_{corr} = A_{leak}^{-1}$$

The correction matrix $A_{corr}$ may be used to cancel the I/Q leakage. The concept of I/Q leakage compensation is illustrated in FIG. 4 with respect to a single input frequency. Signal $X_c$ 402 (shown in the frequency domain) including no I/Q mismatch (no component at $-\omega_0$), is input to an I/Q leakage stage 404. The leakage stage 404 has transfer function $A_{leak}$ 406. The output of leakage stage 404 is uncorrected signal $Y_c$ 408. Signal $Y_c$ includes a desirable component at $\omega_0$ and an undesirable (or leakage) component at $-\omega_0$. Signal $Y_c$ 408 is input to a correction stage 410 with transfer function $A_{corr}$ 412. The output from the correction stage 410 is signal $Z_c$ 414. Since $A_{corr}$ 412 should be tunable and requires high precision, it is usually implemented in the digital domain. The amplitude of the component at $-\omega_0$ for compensated signal $Z_c$ 414 has been reduced with respect to the corresponding component of the uncompensated signal $Y_c$ 408. Due to imperfect error estimation and finite word-length digital correction, some residual I/Q mismatch (component at $-\omega_0$) will remain in the corrected output $Z_c$ 414.

Note that the above described I/Q imbalance compensation concept is valid for both receiver (RX) and transmitter (TX) applications. The RX implementation applies digital "corrections" or "compensation" following the I/Q leakage in the receiver ($A_{leak}$ precedes $A_{corr}$). The TX implementation applies digital "pre-distortion" to the digital signal before the signal is subjected to I/Q leakage in the transmitter circuitry ($A_{corr}$ precedes $A_{leak}$)

The I/Q mismatch ($\delta G_2(\omega)$ and $\delta P_2(\omega)$) of the filters is frequency dependent, while the I/Q mismatch of the front-end ($\delta G_1$ and $\delta P_1$) and the ADCs and/or DACs ($\delta G_3$) can be considered frequency independent in first order. Therefore, the error matrix $A_{leak}(\omega)$ should be estimated for several frequencies. Thus, the implementation of the correction matrix $A_{corr}(\omega)$ becomes costly since it should be effective over the whole band of frequencies of interest. Known frequency-dependent I/Q estimation/correction methods treat the zero-IF filters as a black box.

Some known methods (previously referenced) to determine the characteristics of this "black box" require the insertion of an extensive range of test signals obtaining measurements over a large number of frequencies. Then elaborate correction models with numerous modeling variables are determined and implemented. The incorporation of elaborate testing circuitry and elaborate correction circuitry (e.g., sometimes including 1,000 to 100,000 or more gates) may consume significant power, may occupy a significant amount of limited circuit board space available, and may add significant cost to the device. In many low cost, limited power, miniature size applications (e.g., hand-held mobile battery operated communication devices) such test signaling and correction circuitry is highly undesirable. In addition, the use of significant amounts of time required to conduct the tests is also highly undesirable. For a battery operated mobile communications device, the time required to conduct the model characterization testing, drains valuable energy from the battery, limiting normal communications operating time between battery recharges. In addition, normal operations are suspended during the off-line test signal measuring intervals possibly disrupting or limiting service. For other communications devices (e.g., a base station, communicating with multiple mobile communications devices) extensive off-line time for testing may be unacceptable, as it may reduce overall system capacity and may interrupt service. Other known methods may use complex adaptive algorithms requiring complex models, numerous adjustment variables, and may require time to converge. Quality of service may be adversely affected during these convergences.

In light of the above discussion, there is a need for better methods and apparatus to provide I/Q compensation, particularly for low pass real filters. Areas which could use improvement include a reduction in complexity of: the leakage estimation test evaluation circuitry, the leakage estimation test method, the compensation model, and the compensation circuitry. New compensation methods and apparatus which reduce the receiver, transmitter, and/or transceiver off-line time for leakage estimation testing would also be beneficial.

SUMMARY OF THE INVENTION

The invention describes apparatus and methods for measuring, determining, and compensating for frequency dependent imbalance in real filter pairs, e.g., I/Q frequency dependent imbalance in I/Q real LPF pairs in receivers, transmitters, and/or transceivers. In addition, the invention may also measure, determine, and/or compensate for some frequency independent imbalances in the receiver and/or transmitter chain, such as I/Q frequency independent imbalances caused by ADC pairs and/or DAC pairs.

An I/Q compensation method in accordance with the invention uses a simple compensation module, placed in the receiver/transmitter chain, with a gain adjustment coefficient and a delay adjustment coefficient. A simple compensation module in accordance with the present invention is in contrast to known methods employing a complex compensation module using numerous, e.g., 100's or 1000's or more, of adjustment variables.

The gain adjustment coefficient may be determined using simple calculations, e.g., a gain ratio, of off-line amplitude measurement data collected at a selected gain measurement frequency. In some embodiments, in which the pair of filters to be compensated are low pass filters, the selected gain measurement frequency is selected near the middle of the pass band of the filter. In some embodiments, in which the pair of filters to be compensated are low pass filters, the selected gain measurement frequency is selected "close to dc". In some other embodiments in which the pair of filters to be compensated are band-pass filters, the selected gain measurement frequency is selected "close to" a band-pass center.

The delay adjustment coefficient of the present invention is also determined using simple calculations, e.g., an angle difference and a scale factor, of off-line phase measurement data collected at a selected phase measurement frequency. In some embodiments, the selected phase measurement frequency is a value above the selected gain measurement frequency. In some embodiments, the phase measurement frequency is selected near the edge of the band-pass region of the filters, e.g., "close to" a cutoff frequency of the filters. In some embodiments, the phase measurement frequency is in the upper portion of the transition region of the filters, e.g., a 0-20 dB or a 0-3 dB attenuation region with respect to an average value.

These simple compensation parameter determination methods in accordance with the present invention are in contrast to known implementations for frequency dependent compensation which use complex parameter determination methods, such as adaptive tuning algorithms, segmented models, etc.

In some embodiments of the invention, a single test signal including two distinct frequencies, e.g., a selected gain measurement frequency and a selected phase measurement frequency, is generated and inserted as a single input to both of the LPF paths. An output signal corresponding to each filter of the pair is measured for gain at the first frequency and for phase at the second frequency, e.g., using an FFT as part of a DSP. Relative data between the amplitude measurements of the two output signals at the first frequency, e.g. at the gain frequency, is used to determine the gain error estimate. Relative data between the phase measurements of the two output signals at the second frequency, e.g., the phase frequency, is used to determine the phase error estimate. Since the invention may use a common test signal input to both LPF paths and rely on relative data for compensation parameter determination, the test signal need not be precisely controlled in terms of exact amplitude and/or frequency. This accommodation of the invention to an imprecise test signal facilitates a simple and inexpensive test signal generation implementation. In addition, since the measurements for compensation parameter determination may be obtained from one set of output measurements from a single input signal, the off-line time required to obtain compensation module parameters is minimal.

In some embodiments of the invention, two single tone test signals are generated and applied at different times, e.g., a first signal at a selected gain measurement frequency followed, e.g., almost immediately, by a second signal at a selected phase measurement frequency. The two signals, each occurring at different time with a different frequency may be thought of as a single composite signal.

In some embodiments, the compensation module values may be measured, determined, and loaded into the compensation module once, e.g. at the factory. Alternatively, or in addition, the compensation module values may be measured, determined and loaded into the compensation module once per power on cycle, e.g., at turn-on. In still other embodiments, the compensation module values may be measured, determined, and loaded into the compensation module periodically and/or multiple times during a turn-on cycle, e.g., once initially at turn-on and then periodically at opportunistic times such as when the transmitter/receiver is not being used for communications.

In some embodiments in accordance with the invention, e.g., using transceivers, various components already available may be reused for the test signal generation, measurement, and/or determination. For example, when performing operations related to the compensation of the transmitter's LPFs, the receiver's ADCs may coupled to the output of the transmitter's LPFs. The ADCs may be coupled to an existing DSP. The ADCs and DSP may then be used for output signal measurements. In such embodiments, the effect of the receiver ADCs, e.g., any I/Q path frequency independent gain imbalance, may be removed by performing a second set of measurements with the inputs to the ADCs switched. When performing operations related to the compensation of the receiver, one of the transmitter's DACs may be used to generate an analog test signal.

In some embodiments in accordance with the invention, the gain error estimate used in the compensation module is a constant gain value set to the gain estimate obtained at the single gain test frequency. In some embodiments, the gain factor in the compensation module may be: $1/\hat{\delta}\hat{G}(f_g)$, where $\hat{\delta}\hat{G}(f_g)$ is the determined estimated gain error at selected gain measurement test frequency $f_g$. The delay error estimate (a time delay) used in the compensation module may be a constant with respect to frequency. The delay error estimate may be determined using the determined phase error estimate value at one test frequency if it is assumed that the phase changes linearly with frequency. In some embodiments, the delay error estimate is determined using the equation:

$$\tau = (\delta\hat{P}(f_p))/(2\pi f_p) = \delta\hat{P}(\omega_p)/\omega_p,$$

where $\delta\hat{P}(f_p)$ is the determined estimated phase delay at selected phase measurement test frequency $f_p$. The compensation module of the present invention lends itself to simple digital design implementations, and may have a digital design implementation.

Different types of LPFs, e.g., those filters that have a relatively constant gain over the intended bandwidth and have a relatively linear phase error over the intended bandwidth, may be better suited for use with the compensation module of the present invention. Statistical analysis may be used to determine types of real filters that are better suited for the compensation method of the present invention and to select the test frequencies that should be used. Median data from simulation runs may be used to determine the test frequencies selected, e.g., a frequency to use for phase test measurement estimation. One approach is to select the phase test frequency near the cutoff frequency producing the minimal RMS error over the bandpass of the filter. A second approach is to select the phase test frequency near the cutoff where the phase error is observed in the simulation to be dominant. Filter type selection may consider receiver, transmitter, and/or transceiver design in order to accommodate the simple compensation module of the present invention. The method used for selection of the frequency estimation test frequency may be chosen to suit the requirements of the specific application.

BRIEF DESCRIPTION OF THE DRAWINGS

FIG. 17 summarizes comparison results for the four filters evaluated.

DETAILED DESCRIPTION

The present invention involves novel methods and apparatus for compensating frequency dependent mismatch such as frequency dependent mismatch in a pair of analog real low pass filters. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

Figure 1:
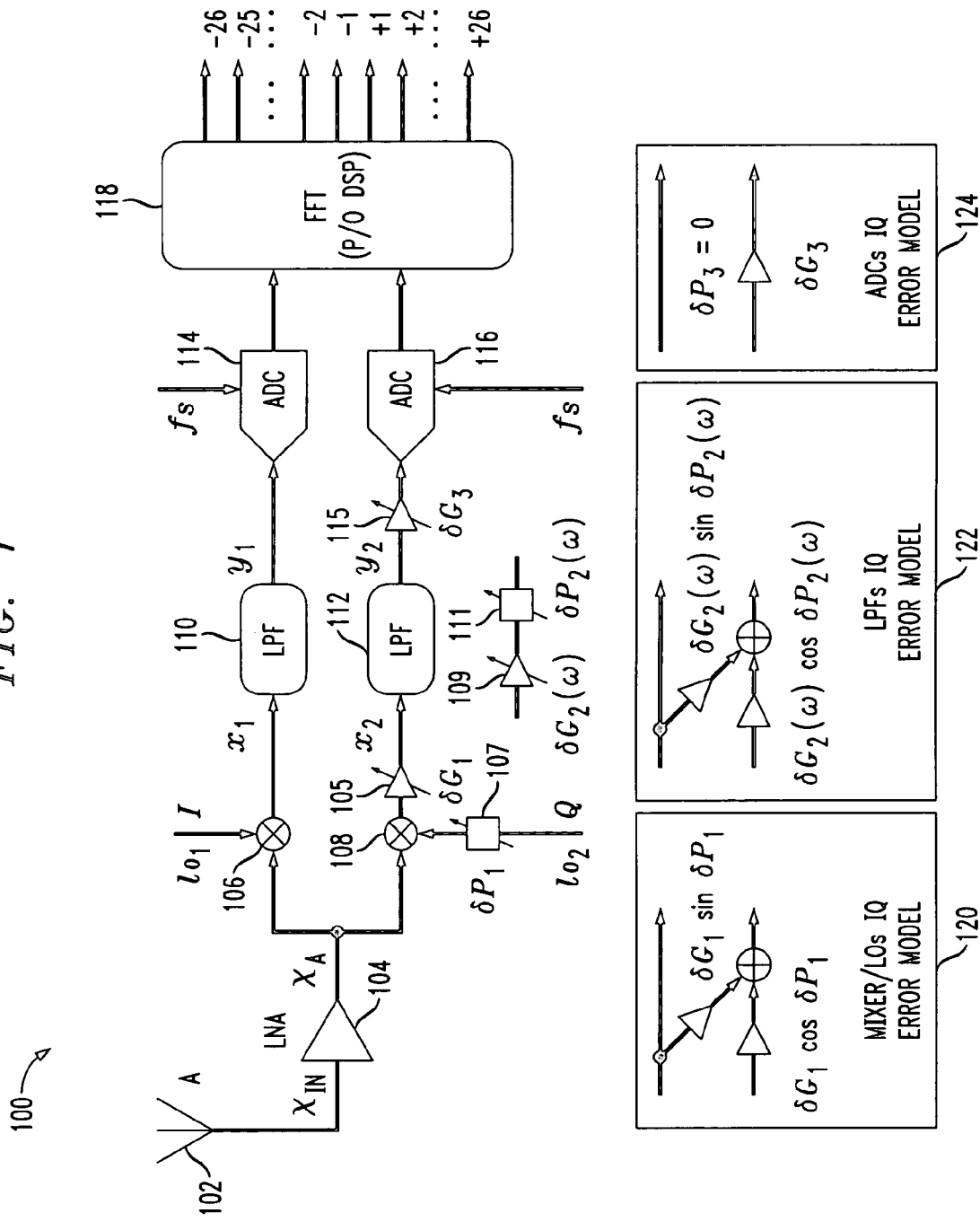
FIG. 1 illustrates an exemplary receiver I/Q chain and I/Q error models.
Figure 5:
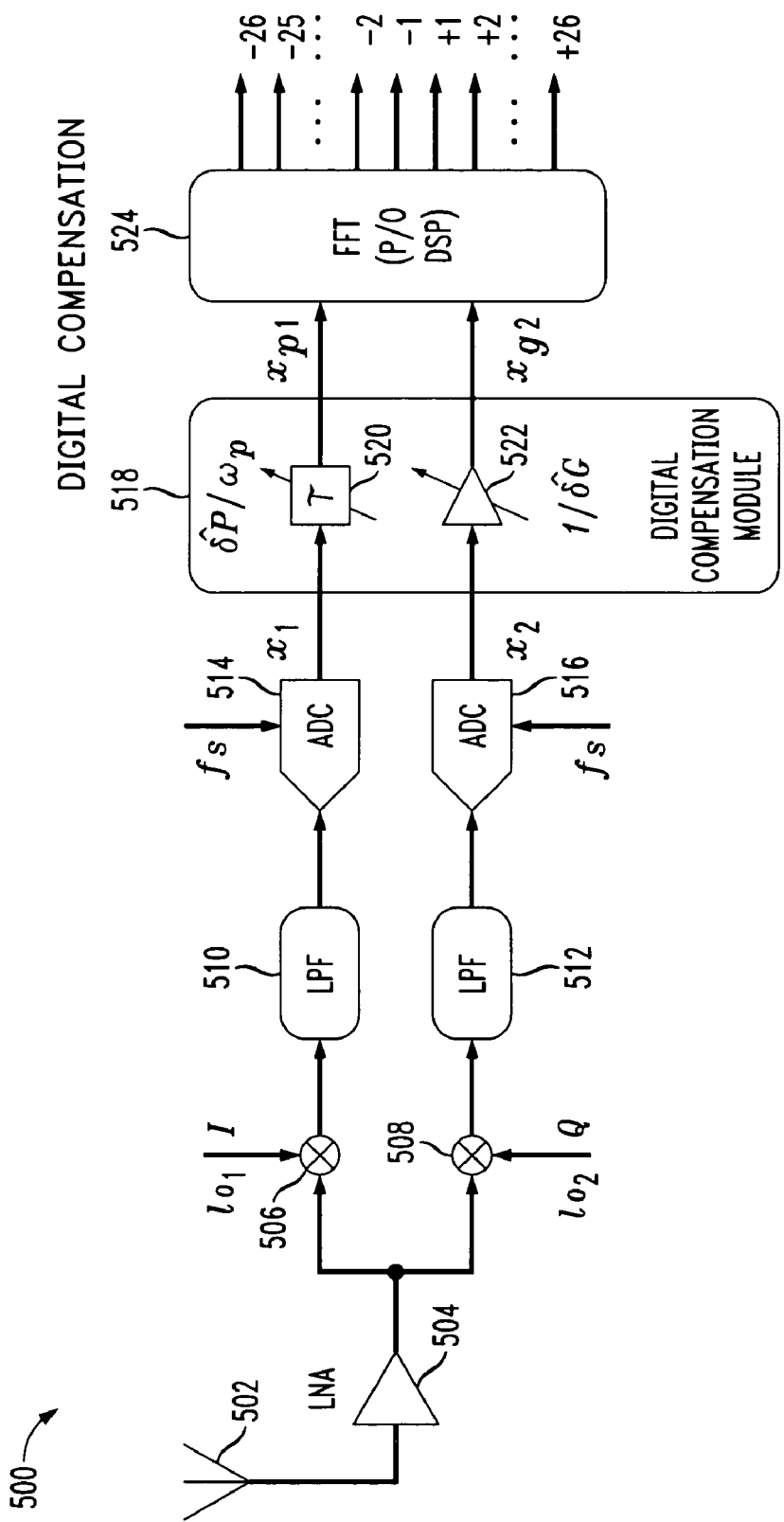
FIG. 5 illustrates an exemplary I/Q receiver chain including a two parameter digital compensation (correction) module in accordance with the present invention.

FIG. 5 illustrates an exemplary I/Q receiver chain 500 implemented in accordance with the present invention. Receiver chain 500 includes an antenna 502, a low noise amplifier (LNA) 504, a pair of I/Q mixers 506, 508, a pair of real LPFs 510, 512, a pair of ADCs 514, 516, a digital compensation (correction) module 518, and a FFT 524. Antenna 502, LNA 504, and I/Q mixer pair 506, 508, may be similar or identical to components 102, 104, 106, and 108, respectively of FIG. 1 and shall not be further described. LPFs 510, 512 may be a real I/Q filter pair, selected in accordance with the invention, such that the filter has a relatively frequency-independent pass-band gain error and a relatively linear pass-band phase error (i.e, a delay) for the pair of filters. An exemplary real I/Q filter pair 510, 512 may be a seventh-order Butterworth low-pass filter. The ADCs 514, 516 output signals $x_1$, $x_2$, respectively, to the digital compensation module 518. The exemplary digital compensation (correction) module 518, implemented in accordance with the invention, includes a delay 520 which has been set to a tuned value ($\delta\hat{P}/\omega_p$) and a gain 522 which has been set to a tuned value ($1/\delta\hat{G}$). The digital compensation (correction) module 518 provides an estimated correction for the I/Q leakage (I/Q imbalance) of the low pass filters 510, 512 (and perhaps of the ADCs 514, 516). The output of the digital compensation (correction) module 518 signals $x_{p1}$ and $x_{g2}$ are input to the FFT 524.

Figure 2:
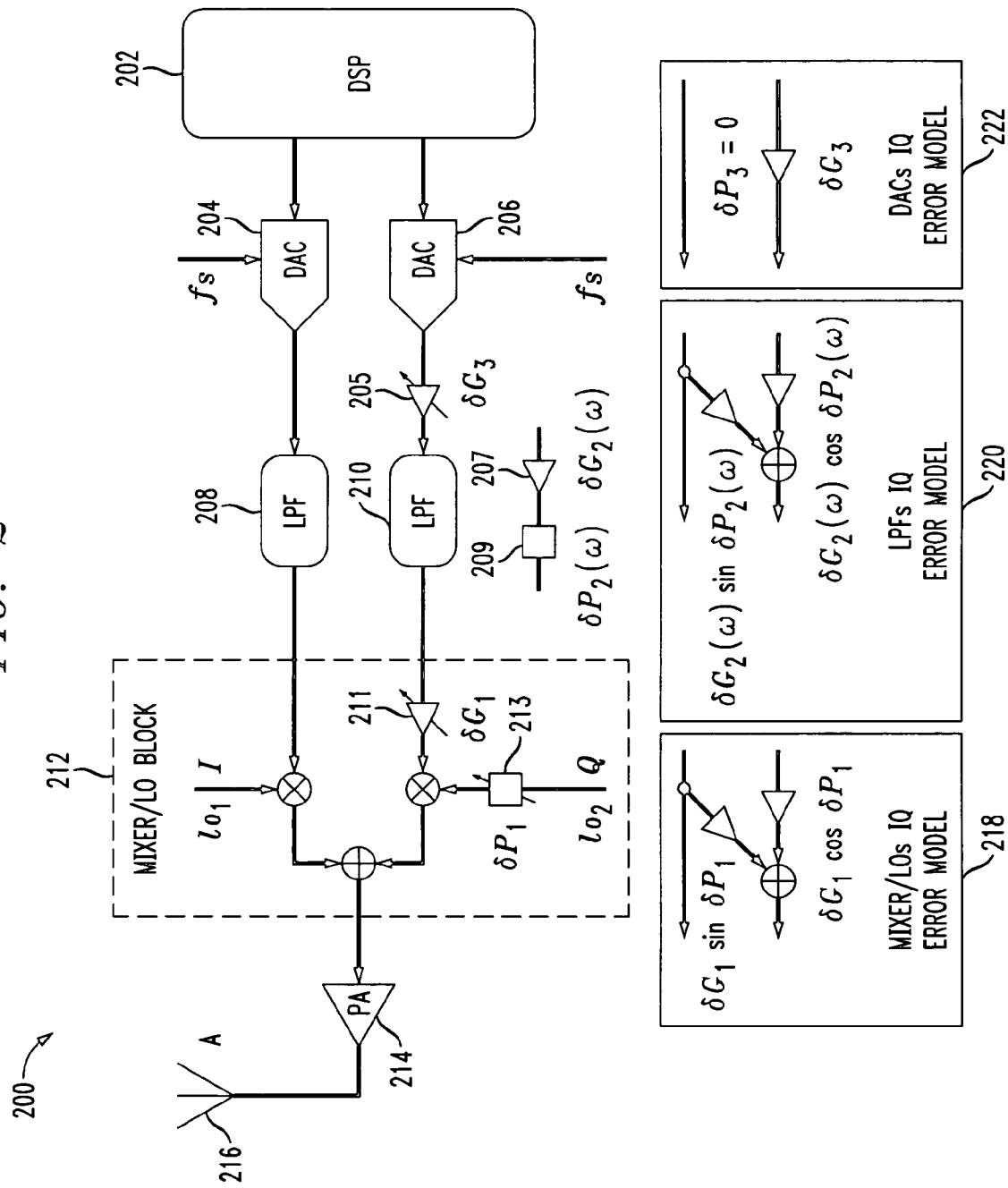
FIG. 2 illustrates an exemplary transmitter I/Q chain and I/Q error models.
Figure 3:
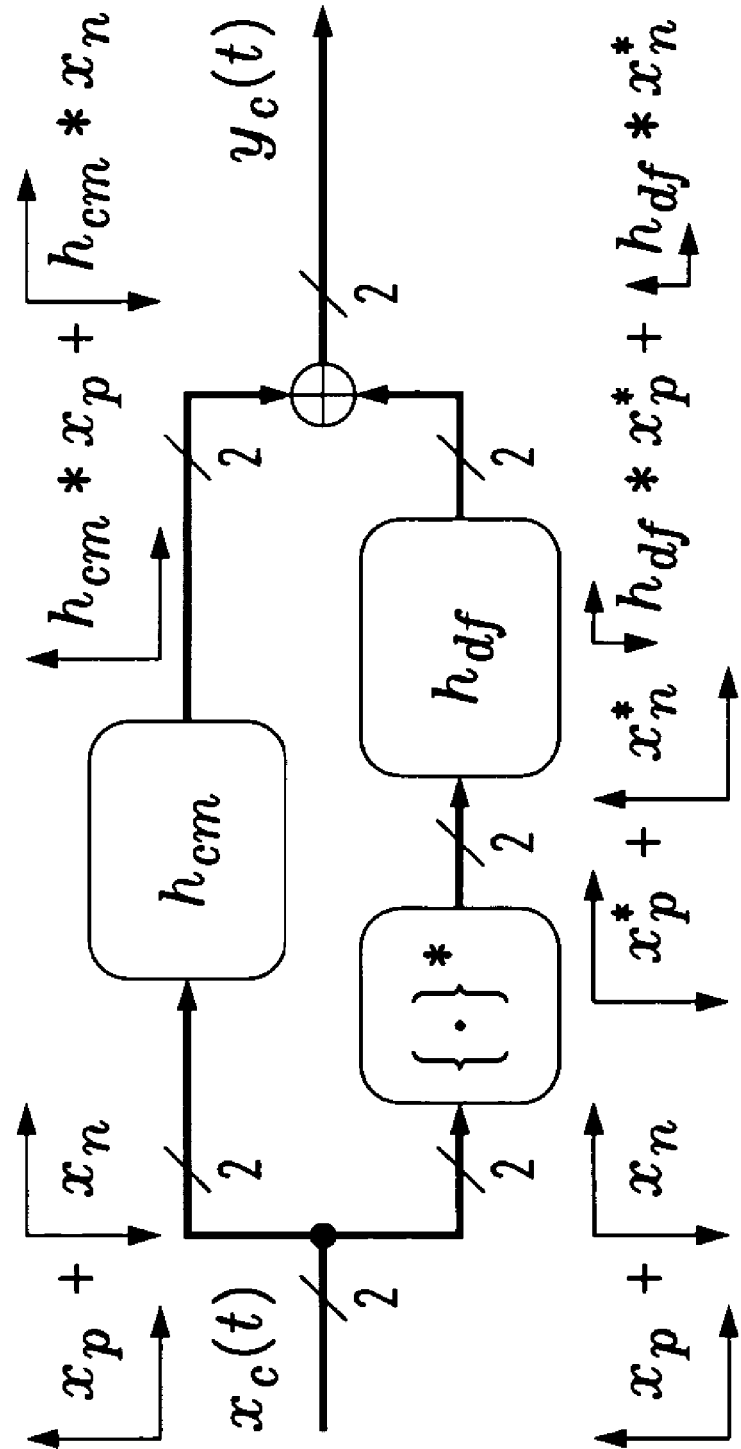
FIG. 3 illustrates a parallel model of an imperfect low-pass filtering operation.
Figure 4:
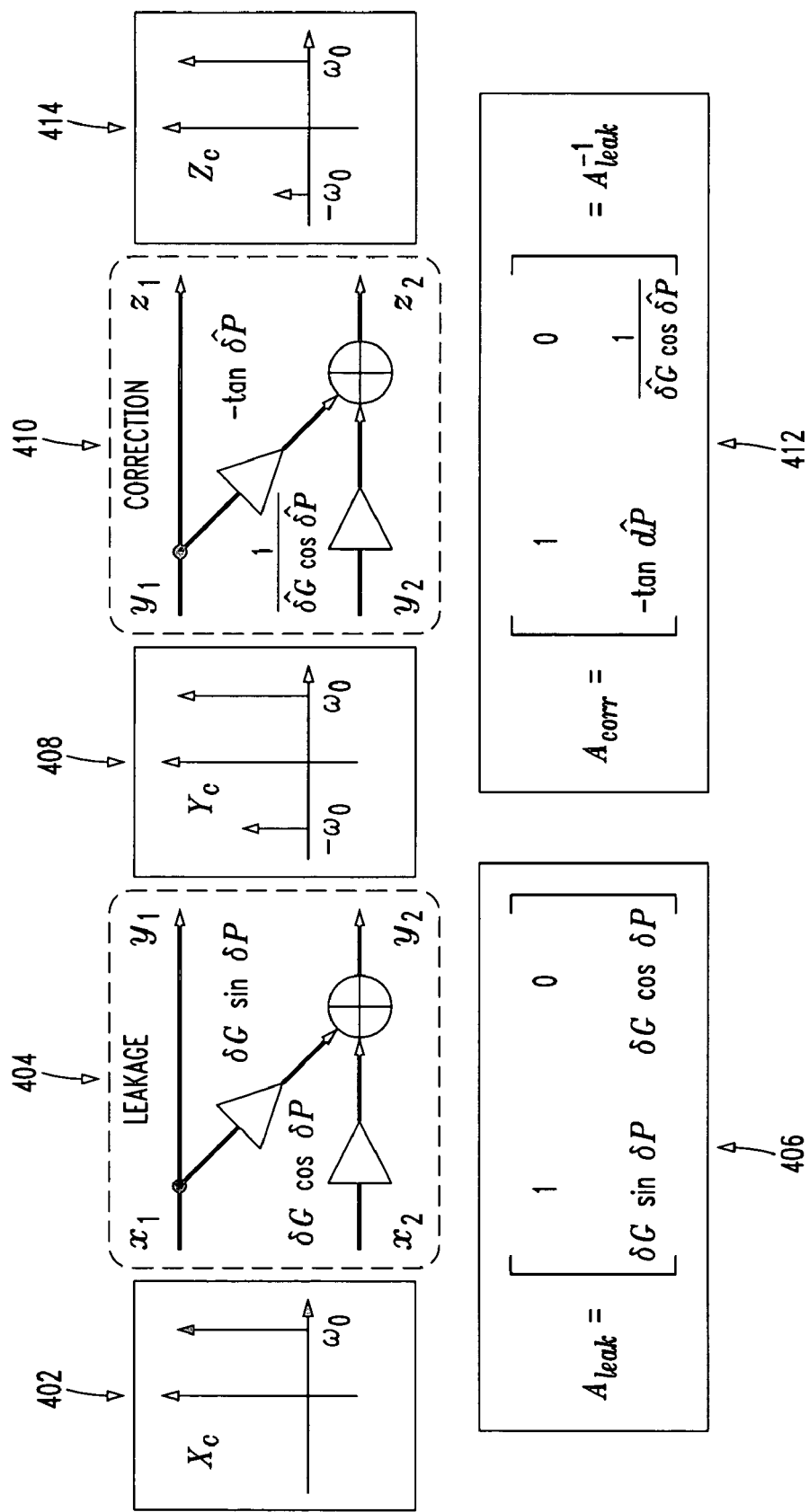
FIG. 4 illustrates the concept of I/Q leakage compensation.
Figure 6:
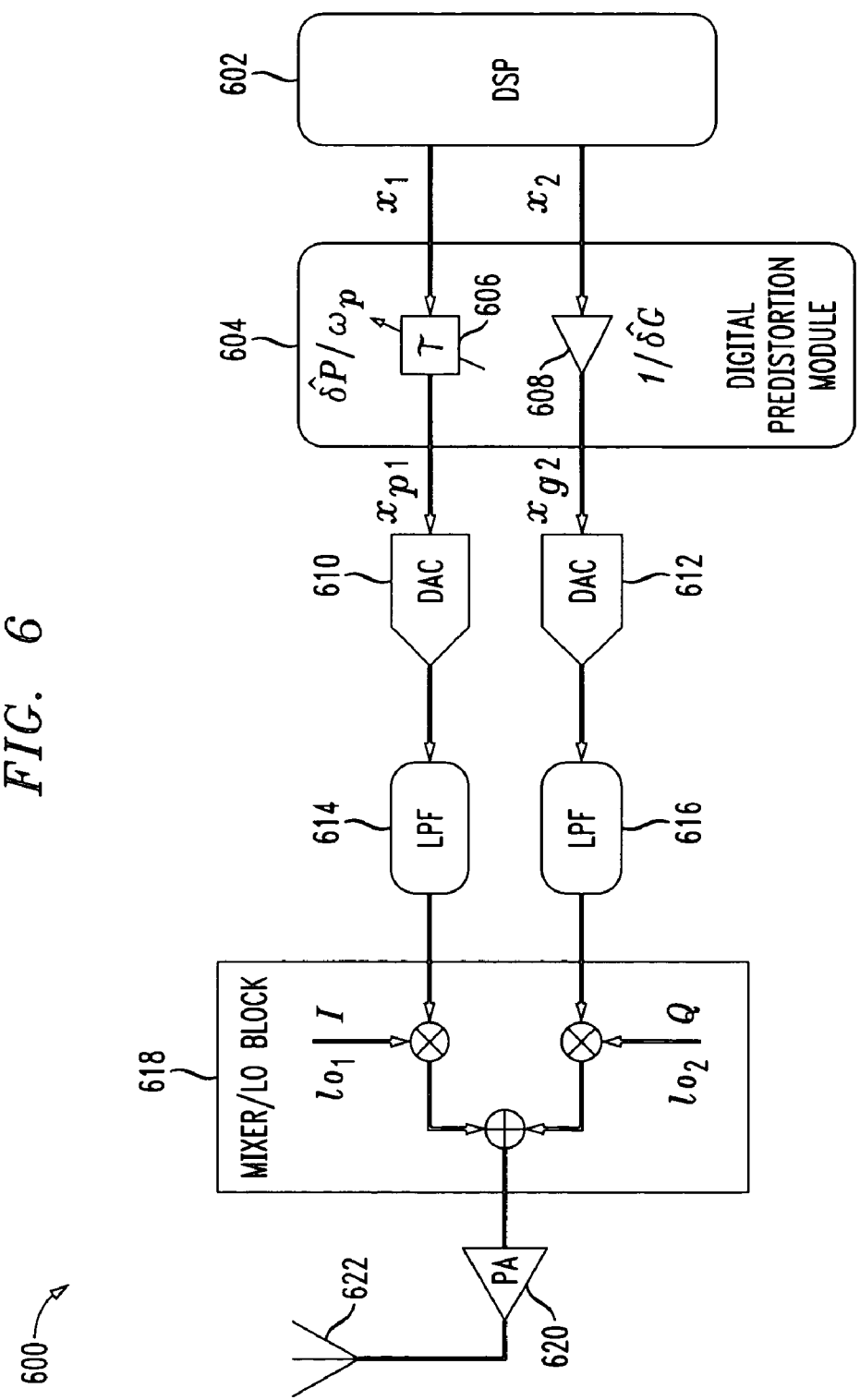
FIG. 6 illustrates an exemplary I/Q transmitter chain including a two parameter digital compensation (pre-distortion) module in accordance with the present invention.

FIG. 6 illustrates an exemplary I/Q transmitter chain 600 implemented in accordance with the present invention. Transmitter chain 600 includes a DSP 602, a digital compensation (pre-distortion) module 604, a pair of DACs 610, 612, a pair of LPFs 614, 616, an I/Q mixer block 618, a power amplifier 620, and an antenna 622. DSP 602 outputs I path signal $x_1$ and Q path signal $x_2$ to the digital compensation (pre-distortion) module 604. The exemplary digital compensation (pre-distortion) module 604, implemented in accordance with the invention, includes a delay 606 which has been set to a tuned value ($\delta\hat{P}/\omega_p$) and a gain 608 which has been set to a tuned value ($1/\delta\hat{G}$). The digital compensation (pre-distortion) module 604 provides an estimated adjustment to the $x_1$ and $x_2$ signals from DSP 602 to compensate for the I/Q leakage (I/Q imbalance) of the low pass filters 614, 616 (and perhaps the DACs 610, 612). The output of the digital compensation module 604 signals, $x_{p1}$ and $x_{g2}$, are input to the DACs 610, 612, respectively. LPFs 614, 616 may be a real I/Q filter pair, selected in accordance with the invention, such that the filter has a relatively frequency-independent pass-band gain error and a relatively linear pass-band phase error (i.e., a delay) for the pair of filters (e.g., a seventh-order Butterworth low-pass filter). Mixer/lo block 618, power amplifier 620, and antenna 622 may be similar or identical to components 212, 214 and 216, respectively of FIG. 2 and shall not be further described.

Figure 7:
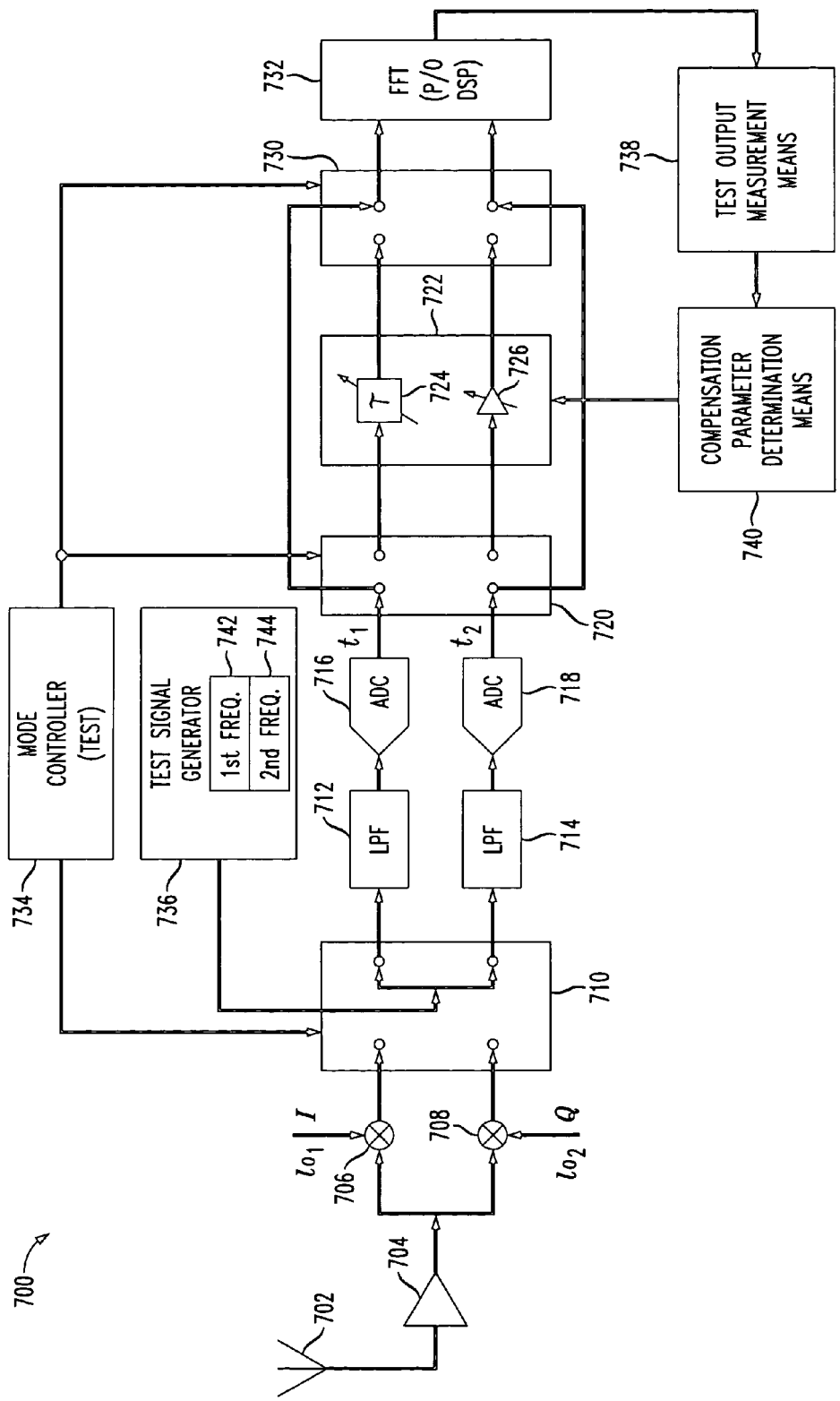
FIG. 7 illustrates an exemplary I/Q receiver chain showing signal routing used for compensation parameter determination in accordance with the present invention.

FIG. 7 illustrates an exemplary I/Q receiver chain 700 showing exemplary signal routing used for compensation parameter determination (e.g., off-line test mode) in accordance with the present invention. Receiver chain 700 includes an antenna 702, a LNA 704, a pair of I/Q mixers 706, 708, a switching module 710, a pair of LPFs 712, 714, a pair of ADCs 716, 718, a switching module 720, a digital compensation (correction) module 722, a switching module 730, a FFT 732, a mode controller 734, a test signal generator 736, a test output measurement means (e.g., a module) 738, and a compensation parameter determination means (e.g., a module) 740.

Mode controller 734 controls the switching modules 710, 720, and 730 to interconnect the various components of the receiver appropriately for the mode selection. Mode controller 734 may also control the activation/deactivation of various components within the receiver depending upon the mode of operation thus conserving power. In FIG. 7, the receiver chain 700 is shown in test mode. In test mode, the antenna 702, the LNA 704 and the mixers 706, 708 do not need to be used and may be deactivated. Mode controller 734 directs test signal(s) from the test signal generator 736 in parallel to each of the LPFs 712, 714. The outputs of the ADCs 716, 718, are routed to the input of the FFT 732 (e.g., directly, bypassing the compensation module 722).

The test signal generator 736 generates a first frequency 742 and a second frequency 744. In accordance with the invention, the frequency values of the first test frequency 742 and the second test frequency 744 are selected to match the LPF pair (712, 714) in the receiver chain 700. First frequency 742, referred to as $f_g$, should be positioned near the middle of the pass-band of the filter (712, 714), and is used in measuring the gain I/Q imbalance. Second frequency 744, referred to as $f_p$, should be positioned near the edge of the band pass filter (712, 714), and is used in measuring the phase I/Q imbalance.

In accordance with the invention, the first test frequency $f_g$ 742 and/or the second test frequency $f_p$ 744 may be selected using statistical analysis (e.g. median information) of simulations of the two-path real filter (712, 714) characteristics. Such simulations may be over a set of distinct frequencies encompassing the band-pass of the filter and for many sets (e.g., 2000) of simulated component mismatches within the filter. First test frequency $f_g$ 742, may be selected near the center of the pass-band in an approximately flat (constant) region. One method to select the second test frequency $f_p$ 744 includes determining simulation IMR (phase contribution), estimating (using a first order linear approximation) IMR (phase) for each of various simulation test frequencies (located near the edge of the band-pass region), determining RMS errors between the simulation IMR (phase) and each estimation IMR (phase), and selecting the simulation test frequency resulting in minimal RMS error over the band-pass of the filter as $f_p$ 744. Using another approach, second test frequency $f_p$ 744 may be selected as the test frequency at the edge of the band-pass where the phase error is observed in the simulation to be dominant. Such a selection will improve the delay estimate near the pass-band edge, but the rms average over the band-pass range might suffer. This trade off between good pass-band edge and low rms may drive the choice of second test frequency $f_p$ 744 depending on the application. Different applications may use different coding schemes and may tolerate different levels of transmission signal quality.

For example, choosing $f_g$=5 MHz and $f_p$=7 MHz is a one possible scenario for an exemplary seventh-order 8.8 MHz Butterworth filter used in applications requiring low rms error. Alternately, choosing $f_g$=5 MHz and $f_p$=8 MHz is another possible scenario for an exemplary seventh-order 8.8 MHz Butterworth filter used in applications requiring low band-pass edge error.

In some embodiments, a two-tone ($f_p$, $f_g$) test signal is generated by signal generator 736 and injected into the input of both LPFs simultaneously. In other embodiments, a one-tone ($f_p$ or $f_g$) test signal may be generated by signal generator 736 and injected into the input of both signals during a first interval of time, followed by a different one-tone ($f_g$ or $f_p$, respectively) test signal during a second interval of time. Since both $\delta\hat{G}$ and $\delta\hat{P}$ are subsequently determined by comparing the relative difference between $t_1$ and $t_2$, the amplitude and frequency accuracy of the injected test signal(s), e.g., a two-tone test signal, are not critical. The test signal(s) may be, and generally is, a real one wire base-band signal. There is no need to generate precise quadrature I/Q calibration tones to be used as test signals. The digital outputs $t_1$ and $t_2$ of the ADCs 716, 718, respectively, are routed into the FFT 732. When a signal including first test frequency $f_g$ 742 is input to LPFs (712,714), test output measurement means 738 measures the amplitudes of signals $t_1$ and $t_2$ at first frequency $f_g$ 742 using FFT 732, obtaining $|T_1(f_g)|$ and $|T_2(f_g)|$. When a signal including second test frequency $f_p$ 744 is input to LPFs (712, 714), test output measurement means 738 measures the phases of $t_1$ and $t_2$ at frequency $f_p$ using FFT 732 obtaining angle $T_1(f_g)$ and angle $T_2(f_g)$. Compensation parameter determination means 740 uses the measured gain and phase information to determine an estimated gain error $$\left(\hat{\delta G}(f_g) = \left|\frac{T_2(f_g)}{T_1(f_g)}\right|\right)$$

and an estimated phase error $$\hat{\delta P}(f_p) = -\frac{\pi}{2} + \text{angle } T_2(f_p) - \text{angle } T_1(f_p).$$

Next, compensation parameter determination means 740 determines a delay compensation parameter ($\hat{\delta P}/\omega_p$) 724 and a gain compensation parameter ($1/\hat{\delta G}$) 726, where $\hat{\delta G}=\hat{\delta G}$ ($f_g$) and $\hat{\delta P}=\hat{\delta P}$ ($f_p$). Then, the determined delay compensation parameter 724 and the determined gain compensation parameter 726 are installed into the digital compensation (correction) module 722.

Figure 8:
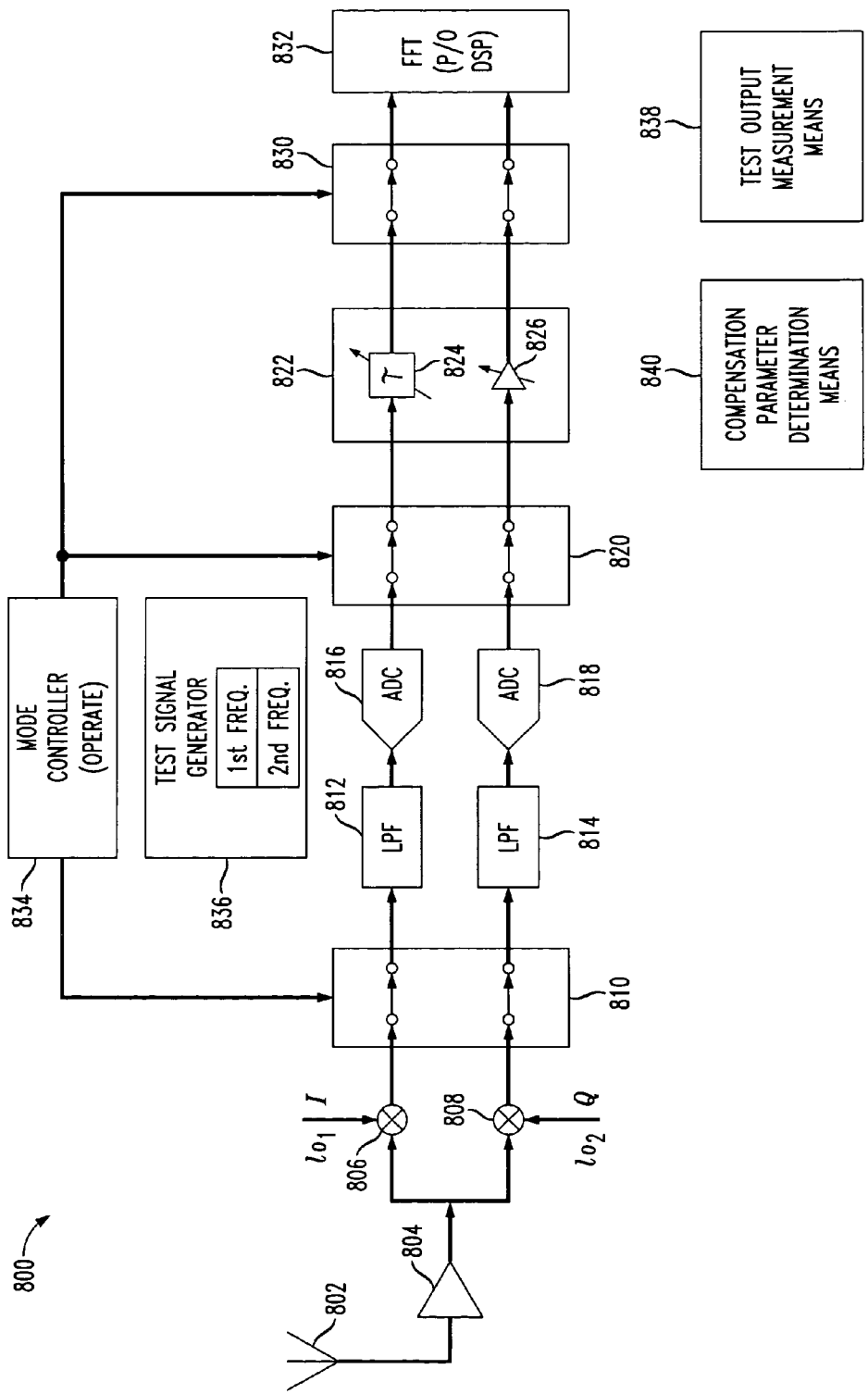
FIG. 8 illustrates an exemplary I/Q receiver chain, including an exemplary compensation (correction) module of the present invention, showing signal routing used for normal receiver operation.

FIG. 8 illustrates an exemplary I/Q receiver chain 800 showing signal routing used for normal receiver operation (e.g., on-line operate mode) in accordance with the present invention. Some components of the receiver chain 800 of FIG. 8 may be the same or similar to the components of the receiver chain 700 of FIG. 7. Receiver chain 800 includes an antenna 802, a LNA 804, a pair of I/Q mixers 806, 808, a switching module 810, a pair of LPFs 812, 814, a pair of ADCs 816, 818, a switching module 820, a digital compensation (correction) module 822, a switching module 830, a FFT 832, a mode controller 834, a test signal generator 836, a test output measurement means 838, and a compensation parameter determination means 840. The components 802, 804, 806, 808, 810, 812, 814, 816, 818, 820, 822, 824, 826, 830, 832, 834, 836, 838, 840 of the receiver chain 800 of FIG. 8 may be the same or similar to the corresponding components 702, 704, 706, 708, 710, 712, 714, 716, 718, 720, 722, 724, 726, 730, 732, 734, 736, 738, 740 of the receiver chain 700 of FIG. 7.

The mode controller 834, set in operate mode, controls switching modules 810, 820, 830 to couple: mixer 806 to LPF 812; mixer 808 to LPF 814; ADC 816 to the input of compensation module 822; ADC 818 to the input of compensation module 822; and compensation module 822 output to FFT 832. In operate mode, the test signal generator 836, the test output measurement means 838, and the compensation parameter determination means 840 are not needed and may be deactivated by the mode controller 834.

Digital compensation (correction) module 822 performs a compensation of the LFP pair (812/814) (and perhaps ADC pair (816/818)) I/Q leakage. The compensation of module 822 applied is a constant gain compensation and a constant delay compensation, in accordance with the invention.

Figure 9:
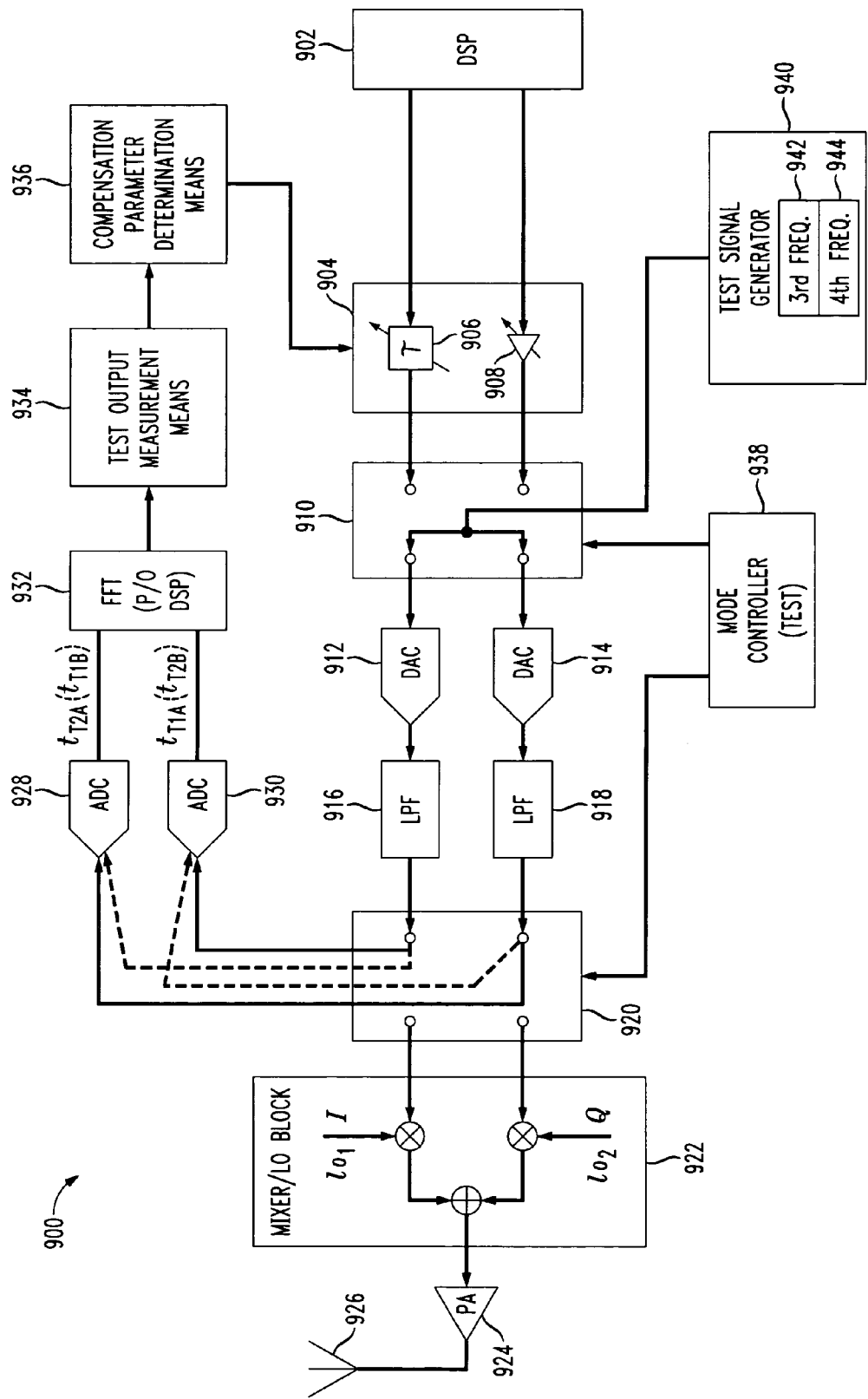
FIG. 9 illustrates an exemplary I/Q transmitter chain showing signal routing used for compensation parameter determination in accordance with the present invention.

FIG. 9 illustrates an exemplary I/Q transmitter chain 900 showing signal routing used for compensation parameter determination (e.g., off-line test mode) in accordance with the present invention. Transmitter chain 900 includes a DSP 902, a digital (pre-distortion) compensation module 904, a switching module 910, a pair of DACs 912, 914, a pair of LPFs 916, 918, a mixer/lo block 922, a power amp 924, an antenna 926, a pair of ADCs 928, 930, a FFT 932, a test output measurement means (e.g., a module) 934, a compensation parameter determination means (e.g., a module) 936, a mode controller 938, and a test signal generator 940.

Mode controller 938 controls the switching modules 910 and 920 to interconnect the various components of the transmitter appropriately for the mode selection. Mode controller 938 may also control the activation/deactivation of various components within the transmitter depending on the mode of operation, thus conserving power. In FIG. 9, the transmitter chain 900 is shown in test mode. In test mode, the DSP 902, the mixer block 922, the power amplifier 924, and the antenna 926 are not needed and may be deactivated. Mode controller 938 directs test signal(s) from the test signal generator 940 in parallel to each of the DACs 912, 914. The outputs of the DACs 912, 914, are routed (e.g., directly) to the input of the LPFs 916, 918, respectively.

The test signal generator 940 includes a third frequency 942 and a fourth frequency 944. In accordance with the invention, the frequency values of the third test frequency 942 and the fourth test frequency 944 are selected to match the LPF pair (916, 918) in the transmitter chain 900. Third frequency 942, referred to as $f_{Tg}$ should be positioned near the middle of the band pass of the filter (916, 918), and is used in measuring the gain I/Q imbalance. Fourth frequency 944, referred to as $f_{Tp}$ should be positioned near the edge of the band pass filter (916, 918), and is used in measuring the phase I/Q imbalance. (Note: subscript T is used in FIGS. 9, 10 and 13 to designate correspondence to the transmitter chain.)

In accordance with the invention, the third test frequency $f_{Tg}$ 942 and/or the fourth test frequency $f_{Tp}$ 944 may be selected based upon statistical analysis (e.g., median information) of simulations of the two-path real filter (916, 918) characteristics. Such selection methods, previously described with respect to the receiver chain 700 of FIG. 7, are also applicable with respect to the transmitter chain 900 of FIG. 9.

In some embodiments, a two-tone ($f_{Tp}$, $f_{Tg}$) test signal is generated by test signal generator 940 and injected to the input of both DACs (912, 914) simultaneously. In other embodiments, a one-tone ($f_{Tp}$ or $f_{Tg}$) test signal is generated by test signal generator 940 and may be injected into the input of both DACs during a first interval of time, followed by a different one-tone ($f_{Tg}$ or $f_{Tp}$) test signal during a second interval of time.

The testing of FIG. 9 is used to model I/Q imbalance of the LPFs 916, 918 (and perhaps the DACs 912, 914). The ADCs 928, 930 are used for testing purposes and are not in the operational transmission chain. Therefore, any I/Q imbalance contribution during the testing due to the ADCs 928, 930 should be removed. One exemplary method to remove ADC (928,930) I/Q imbalance contribution is to perform two sets of measurements for each frequency $f_{Tp}$, $f_{Tg}$. A first set of measurements may be conducted with LPF 916 coupled to ADC 930 and LPF 918 coupled to ADC 928 (shown by solid lines). A second set of measurements may be conducted with LPF 916 coupled to ADC 928 and LPF 918 coupled to ADC 930 (shown be dotted lines). Since the I/Q imbalance errors due to the ADCs 928, 930 are primarily gain errors, in some embodiments, only one set of measurements are performed at $f_{Tp}$. The switching of the routing between ADCs 928, 930 may be controlled by the mode controller 938. The digital outputs $t_{T1A}$ and $t_{T2A}$ of the ADCs 930,928, respectively (solid line configuration) are routed into the FFT 932. The digital outputs $t_{T1B}$ and $t_{T2B}$ of the ADCs 928, 930, respectively (dashed line configuration) are routed into the FFT 932. When a signal including third test frequency $f_{Tg}$ 942 is input to DACs (912,914), test output measurement means 934 measures the amplitudes of signals ($t_{T1A}$ and $t_{T2A}$) or ($t_{T1B}$ and $t_{T2B}$) at frequency $f_{Tg}$ using FFT 932 and obtains ($|T_{T1A}(f_{Tg})|$ and $|T_{T2A}(f_{Tg})|$) or ($|T_{T1B}(f_{Tg})|$ and $|T_{T2B}(f_{Tg})|$). When a signal including fourth test frequency $f_{Tp}$ 944 is input to LPFs (912,914), test output measurement means 934 measures the phases of signals ($t_{T1A}$ and $t_{T2A}$) or ($t_{T1B}$ and $t_{T2B}$) at frequency $f_{Tp}$ using FFT 932 and obtains ((angle $T_{T1A}(f_{Tp})$ and angle $T_{T2A}(f_{Tp})$) or ((angle $T_{T1B}(f_{Tp})$ and angle $T_{T2B}(f_{Tp})$)). Compensation parameter determination means 936 uses the measured gain and phase information to determine an estimated gain error $$\hat{\delta G}(f_{Tg}) = \sqrt{\frac{T_{T2A}(f_{Tg})}{T_{T1A}(f_{Tg})} * \frac{T_{T2B}(f_{Tg})}{T_{T1B}(f_{Tg})}}$$

and an estimated phase error $$\hat{\delta P}(f_{Tg}) = -\frac{\pi}{2} + \left(\frac{\text{angle } T_{T2A}(f_{Tp}) - \text{angle } T_{T1A}(f_{Tp}) + \text{angle } T_{T2B}(f_{Tp}) - \text{angle } T_{T1B}(f_{Tp})}{2}\right).$$

Alternatively, the phase error may be determined using one set of data where (($\hat{\delta P}(f_{Tp})=-\pi/2+$(angle $T_{T2A}(f_{Tp})$)–angle $T_{T1A}(f_{Tp})$) or (($\hat{\delta P}(f_{Tp})=-\pi/2+$(angle $T_{T2B}(f_{Tp})$)–angle $T_{T1B}(f_{Tp})$)). Next, compensation parameter determination means 936 determines a delay compensation parameter ($\hat{\delta P} \omega_{Tp}$) 906 and a gain compensation parameter ($1/\hat{\delta G}$) 908, where $\hat{\delta G}= \hat{\delta G}(f_{Tg})$ and $\hat{\delta P}=\hat{\delta P}(f_{Tp})$). Then, the determined delay compensation parameter 906 and the determined gain compensation parameter 908 are installed into the digital pre-distortion (correction) module 904.

Figure 10:
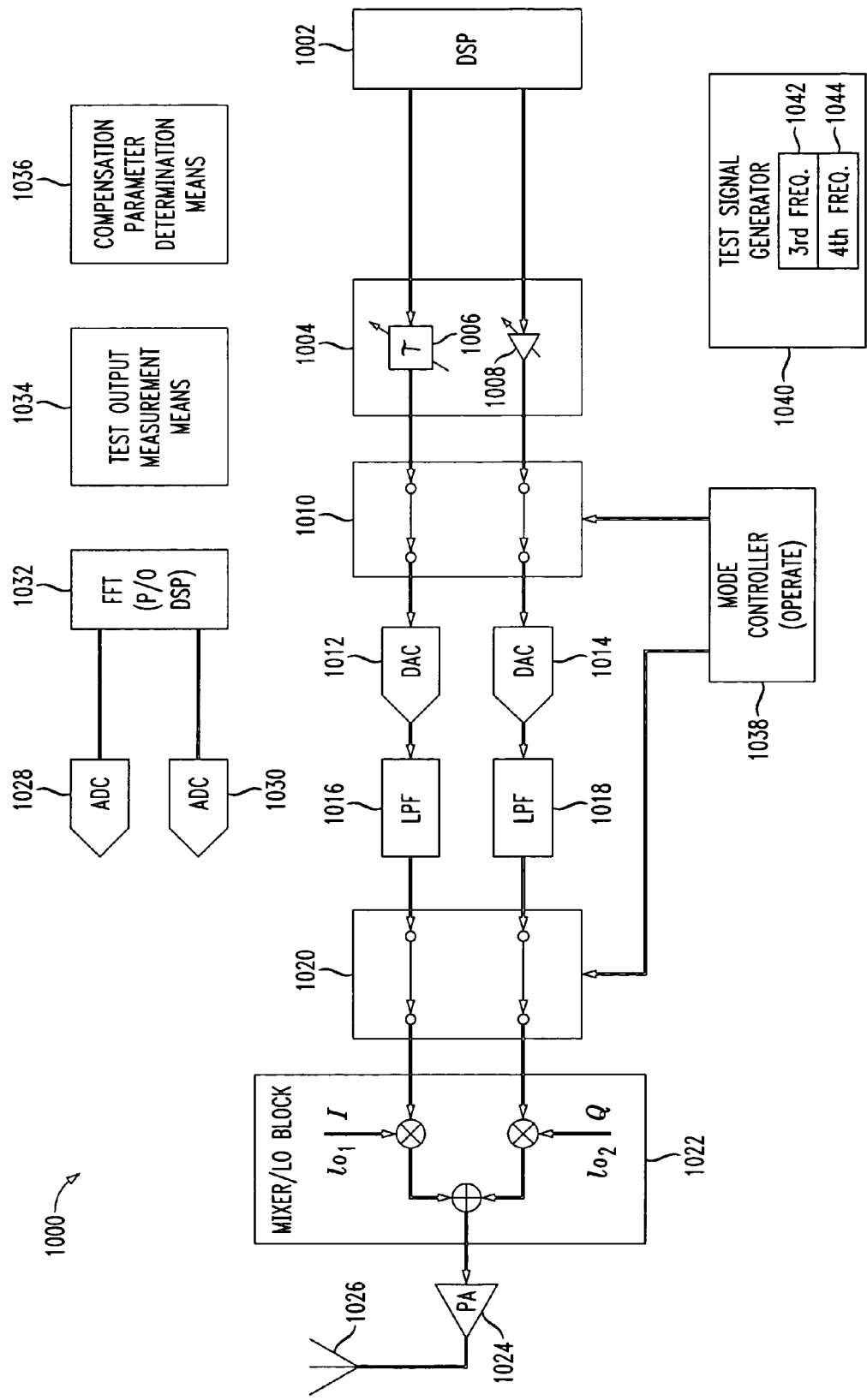
FIG. 10 illustrates an exemplary I/Q transmitter chain, including an exemplary compensation (pre-distortion) module of the present invention, showing signal routing used for normal transmitter operation.

FIG. 10 illustrates an exemplary I/Q transmitter chain 1000 showing signal routing used for normal transmitter operations (e.g., on-line operate mode) in accordance with the present invention. The components of the transmitter chain 1000 of FIG. 10 may be the same or similar to the components of the transmitter chain 900 of FIG. 9. Transmitter chain 1000 includes a DSP 1002, a digital (pre-distortion) compensation module 1004, a switching module 1010, a pair of DACs 1012, 1014, a pair of LPFs 1016, 1018, a switching module 1020, a mixer/lo block 1022, a power amp 1024, an antenna 1026, a pair of ADCs 1028, 1030, a FFT 1032, a test output measurement means 1034, a compensation parameter determination means 1036, a mode controller 1038, and a test signal generator 1040. The components 1002, 1004, 1006, 1008, 1010, 1012, 1014, 1016, 1018, 1020, 1022, 1024, 1026, 1028 1030, 1032, 1034, 1036, 1038, 1040 of the transmitter chain 1000 of FIG. 10 may be the same or similar to the corresponding components 902, 904, 906, 908, 910, 912, 914, 916, 918, 920, 922, 924, 926, 928, 930, 932, 934, 936, 938, 940 of the transmitter chain 900 of FIG. 9.

The mode controller 1038, set in operate mode, controls switching modules 1010 and 1020 to couple: pre-distortion module 1004 to DACs 1012 1014; and LPFs 1016, 1018 to Mixer/Lo block 1022. In operate mode, the ADCs 1028, 1030, the FFT module 1032, the test signal generator 1040, the test output measurement means 1034, and the compensation parameter determination means 1036 are not needed and may be deactivated by the mode controller 1038.

Digital pre-distortion (correction) module 1004 performs a compensation of the LFP pair (1016/1018) and DAC pair (1012/1014) I/Q leakage. The compensation of module 1004 applied is a constant gain compensation 1008 and a constant delay compensation 1006, in accordance with the invention.

In some embodiments of the invention, e.g., a transceiver including both a receiver chain and a transmitter chain, some of the components used for the compensation determination in each of the chains may be shared. For example, ADCs 928, 930 (described with respect to transmitter chain 900) may be the same ADCs 716, 718 of receiver chain 700, and a common mode controller may switch the interconnection routing as required at the appropriate times. For a transceiver, in general, the TX DACs could generate calibration signals for the RX filters, and the RX ADCs could be used to calibrate the TX filters without relying on the I/Q matching of the calibrating hardware.

Various variations of the test signal generation and injection are possible in accordance with the invention. For example, with regard to the transmitter chain 900 of FIG. 9, the circuit may be opened and analog test signal(s) may be generated and injected at the input to both LPFs 916, 918. In such an embodiment, the I/Q imbalance, from such testing, could be determined for LPFs 916, 918, but would exclude the effect from DACs 912, 914. In accordance with the invention, the LPFs may be the most important components through which the test signals (used for compensation module tuning in accordance with the invention) should pass, since they include a frequency dependent I/Q imbalance.

Figure 11:
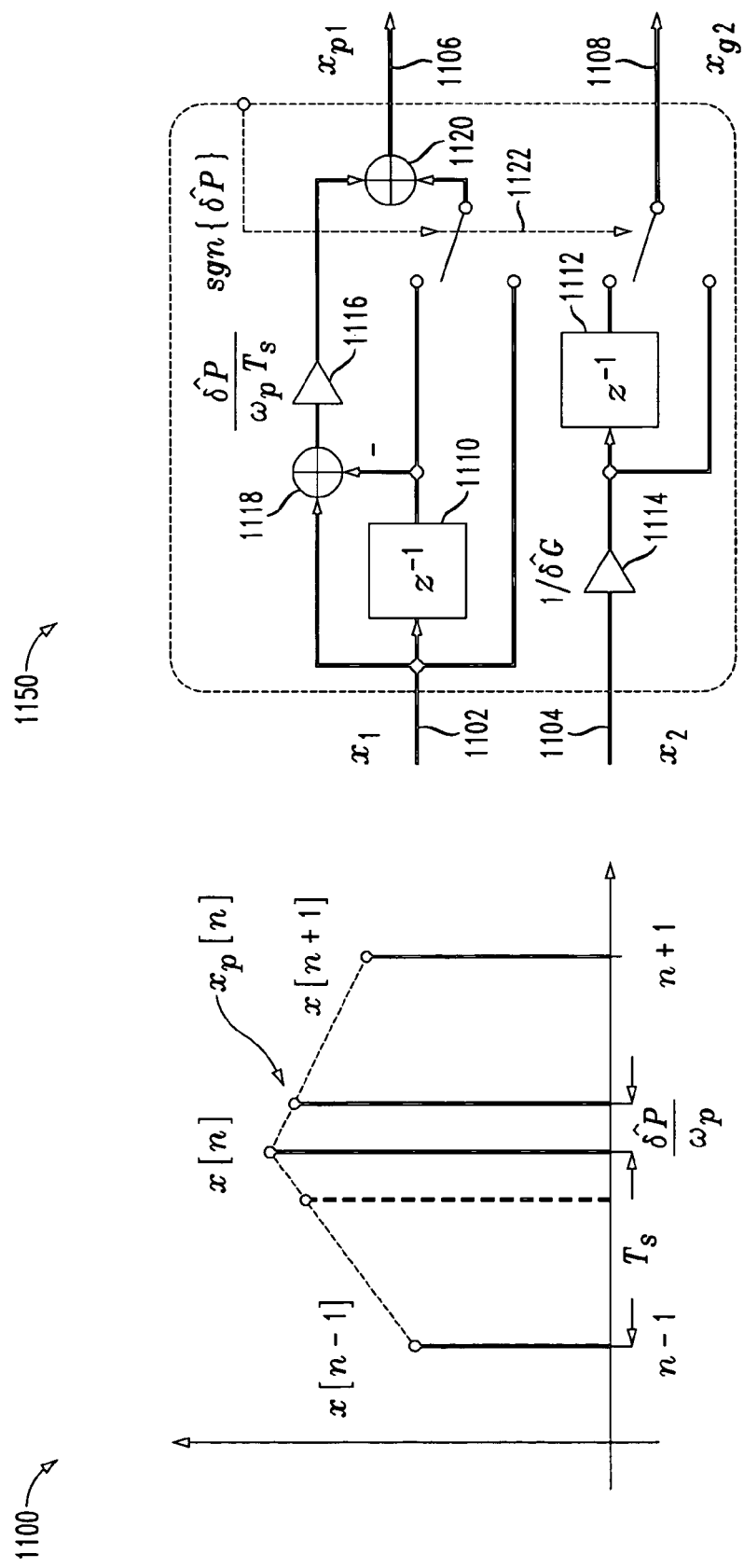
FIG. 11 illustrates an exemplary variable delay (first-order interpolation) filter and an exemplary digital compensation (correction/pre-distortion) circuit in accordance with the present invention.

The digital compensation module, of the present invention, includes a tunable delay and a tunable gain. The examples of receiver and transmitter chains of the present invention have shown the tunable delay in the I path and the tunable gain in the Q path. Other embodiments of the compensation module are possible, in accordance with the invention. For example, the tunable gain may be in the Q path and the tunable delay may be in the I path. Alternatively, the tunable delay and the tunable gain may be both in the I path or the tunable delay and the tunable gain may be both in the Q path. The tunable delay, of the compensation module, can be well approximated by a first-order interpolation filter since the delay mismatch is expected to be small compared to the sampling period $T_s=1/f_s$. Graph 1100 of FIG. 11 illustrates a variable delay with a first-order interpolation. Block 1150 illustrates an exemplary conceptual digital compensation module that may be used as a compensation (correction) module in a receiver chain, or as a pre-distortion (correction) module in a transmitter chain, in accordance with the invention. Module 1150 includes an upper branch, used for phase correction operations, and a lower branch, used for gain correction operations. Module 1150 includes two multipliers 1114 (with a tunable coefficient $1/\hat{\delta G}$), 1116 (with a tunable coefficient $\hat{\delta P}/\omega_p T_s$), two adders 1118, 1120 and two delay elements 1110, 1112. Input signals, $x_1$ 1102 and $x_2$ 1104, are compensated by module 1150 outputting signals $x_{p1}$ 1106 and $x_{g2}$ 1108. When a signal $x(n)$ is delayed by $\tau=\hat{\delta P}/\omega_p$, $\tau>0$, then the resulting signal $x_p(n)$ can be calculated from $x(n+1)$ and $x(n)$ as illustrated in FIG. 1100 and represented by switch 1122 in the up position in drawing 1150. The gain correction branch includes a $T_s$ delay (represented by delay element 1112) for $\tau>0$, in order for the gain correction branch to be synchronized with the phase correction operations. If the delay is negative, (i.e., $\tau \leq 0$), then $x(n-1)$ and $x(n)$ are used to determine $x_p(n)$, and the module is represented with switch 1122 in the down position in drawing 1150.

In some embodiments of the invention, the compensation module of the present invention may be an analog implementation rather than a digital implementation.

Figure 12:
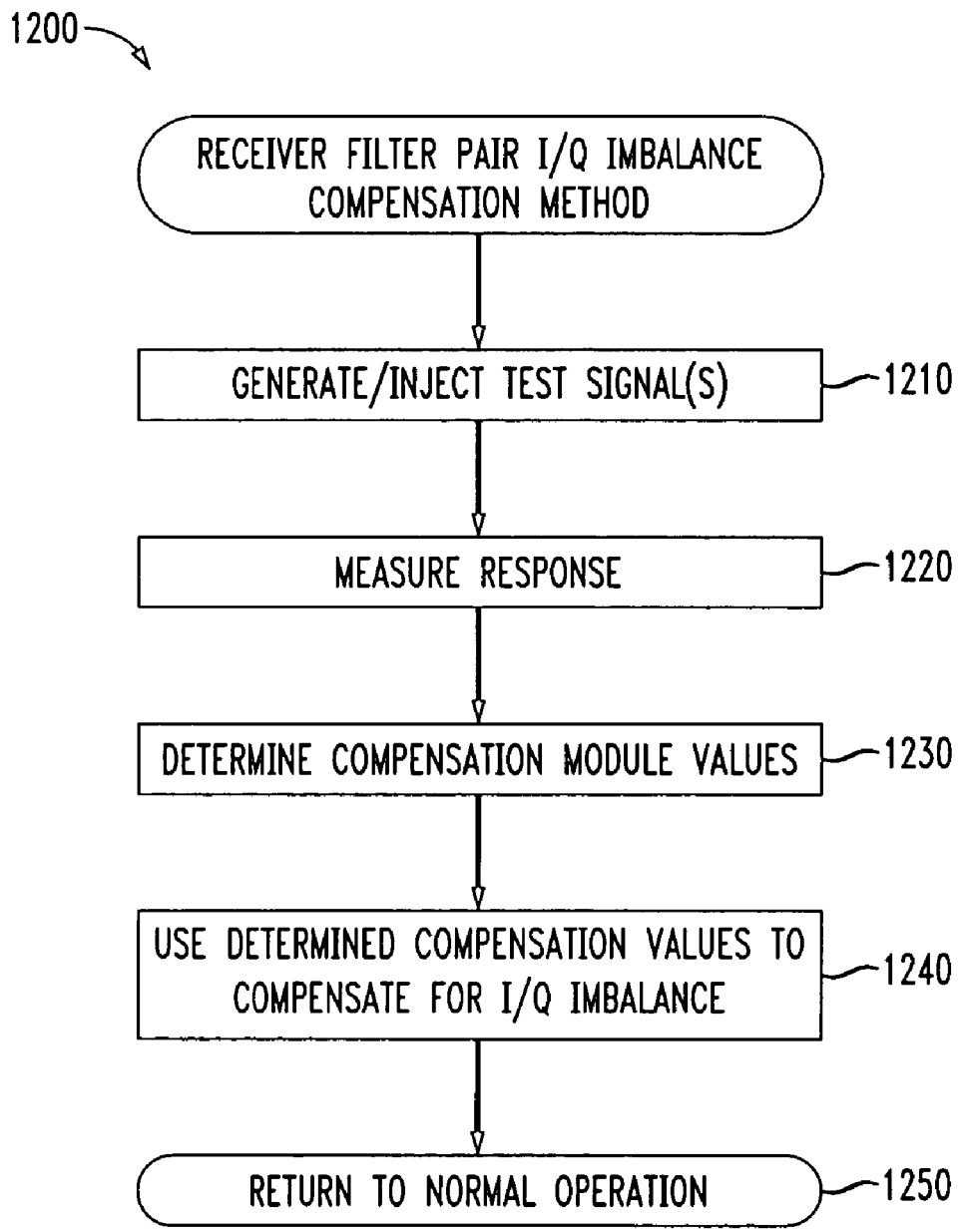
FIG. 12 is a flowchart of an exemplary receiver filter pair I/Q imbalance compensation method in accordance with the present invention.

FIG. 12 is a flowchart 1200 illustrating an exemplary receiver filter pair I/Q imbalance compensation method in accordance with the present invention. The test signal(s) are generated and injected into the filter chain (1210). The response to the injected test signals is measured (1220). Compensation module values are determined (1230). Next, the determined compensation values are used to compensate for I/Q imbalance (1240). The receiver then returns to normal operation (1250).

The blocks of the flowchart 1200 of FIG. 12 shall now be discussed in more detail in the context of an exemplary receiver LPF pair I/Q compensation operation in accordance with the methods of the present invention. The compensation operation starts, when the receiver is configured in a filter leakage test mode. FIG. 7 represents such an off-line filter leakage test mode. Mode controller 734 has controlled the switching modules 710, 720, and 730 to disconnect the mixers 706, 708 from the LPFs 712, 714 and to bypass the compensation module 722. In step 1210, test signal(s) are generated by test signal generator 736 and injected in the filter chain; the response output is measured (1220) by the test output measurement means 738 using FFT 732.

Two exemplary techniques of the signal generation/injection and measurement operations (1210 and 1220) are described below. In the first approach, two analog test signals, each at a distinct frequency are sequentially generated/injected and measured. A first analog test signal (e.g., exemplary test signal:$test_A(f_g)$) at a first frequency ($f_g$), 742, is generated by test generator 736 and applied to the inputs of both receiver I/Q LPFs 712, 714. The test output measurement means 738 measures the amplitude of the output signals $t_1(f_g), t_2(f_g)$ from each ADC 716, 718, respectively using FFT 732, obtaining $|T_1(f_g)|$ and $|T_2(f_g)|$. Next, the test signal generator 736 generates and applies a second analog test signal (e.g., exemplary test signal:$test_B(f_p)$) at a second test frequency ($f_p$) 744 to the inputs of the LPFs 712, 714. Then, the test output measurement means 738 measures the phase of the output signals $t_1(f_p), t_2(f_p)$ from each ADC 716, 718, respectively, using FFT 732, obtaining angle $T_1(f_p)$ and angle $T_2(f_p)$.

A second approach of the signal generation/injection and measurement operations (1210 and 1220) shall now be described. In this second approach, a single analog test signal including components at two distinct frequencies is generated by test signal generator 736, injected in the receiver chain and measured by the test output measurement means 738 using FFT 732. A first analog test signal including a first frequency component and a second frequency component (e.g., exemplary test signal:$test_c(f_g,f_p)$) is applied to the inputs of both LPFs 712, 714. The test output measurement means 738 measures the amplitude of the output signals $t_1$ and $t_2$ at the first frequency $f_g$ and the phase of the output signals $t_1$ and $t_2$ at the second frequency $f_p$ obtaining $|T_1(f_g)|$, $|T_2(f_g)|$, angle $T_1(f_p)$, and angle $T_2(f_p)$.

The compensation module values are determined by the compensation parameter determination means 740 using the measured amplitude and phase information (1230). A receiver I/Q filter gain error value 726 is determined by the compensation parameter determination means 740 using the amplitude measurements at the first frequency as described below. An estimated gain error at frequency $f_g$ is determined ($\hat{\delta G}(f_g)=|T_2(f_g)/T_1(f_g)|$) and a gain compensation parameter ($1/\hat{\delta G}$) 726 is determined by module 740 where $\hat{\delta G}=\hat{\delta G}(f_g)$. A receiver I/Q filter delay error value 724 is determined by the compensation parameter determination means 740 based upon the phase measurements at the second frequency as described below. An estimated phase error (($\hat{\delta P}(f_p)=-\pi/2+$angle $T_2(f_p)$–angle $T_1(f_p)$) at frequency $f_p$ is determined. Next, compensation parameter determination means 740 determines a delay compensation parameter ($\hat{\delta P}/\omega_p$) 724 where $\hat{\delta P}=\hat{\delta P}(f_p)$.

The determined receiver I/Q gain and delay values 726, 724 are applied (installed) in the I/Q filter compensation "correction" module 722 (1240).

The receiver chain is retuned to normal (e.g., on-line) operational mode (1250). Here, the mode controller 734 may direct the switching modules 710, 720, and 730 to reconfigure the receiver chain. Such a reconfigured receiver chain may be represented by FIG. 8. The gain and delay values installed in the compensation module 722, may remain and be used until another test signal compensation operation is performed.

In some embodiments, the compensation operation of FIG. 12 may be performed once, e.g., at the factory prior to shipment. In such an embodiment, some modules (e.g., the test signal generator 736, the test output measurement means 738, and the compensation parameter determination means 740) may be external testing devices and not included in the receiver. Alternatively or in addition, the test signal compensation operation may be performed once during each power on cycle (e.g., at turn-on as part on an initialization sequence). Such turn-on tuning during initialization may remove some component errors due to aging, current ambient temperature, and/or current supply voltage. Alternately or in addition, the test signal compensation operation may be performed intermittently during operations (e.g., once at power-on, occasionally or periodically during the operation at time intervals where the receiver is not be utilized for normal communications). Such occasional or periodic tuning may allow for adjustments as components in the receiver change due to self-heating of the components within the receiver, and/or errors due to supply voltage fluxuations. In some embodiments, a re-tuning compensation operation may be initiated by an observed degradation in the quality of the received signal (e.g., a bit error rate exceeding a threshold level).

Figure 13:
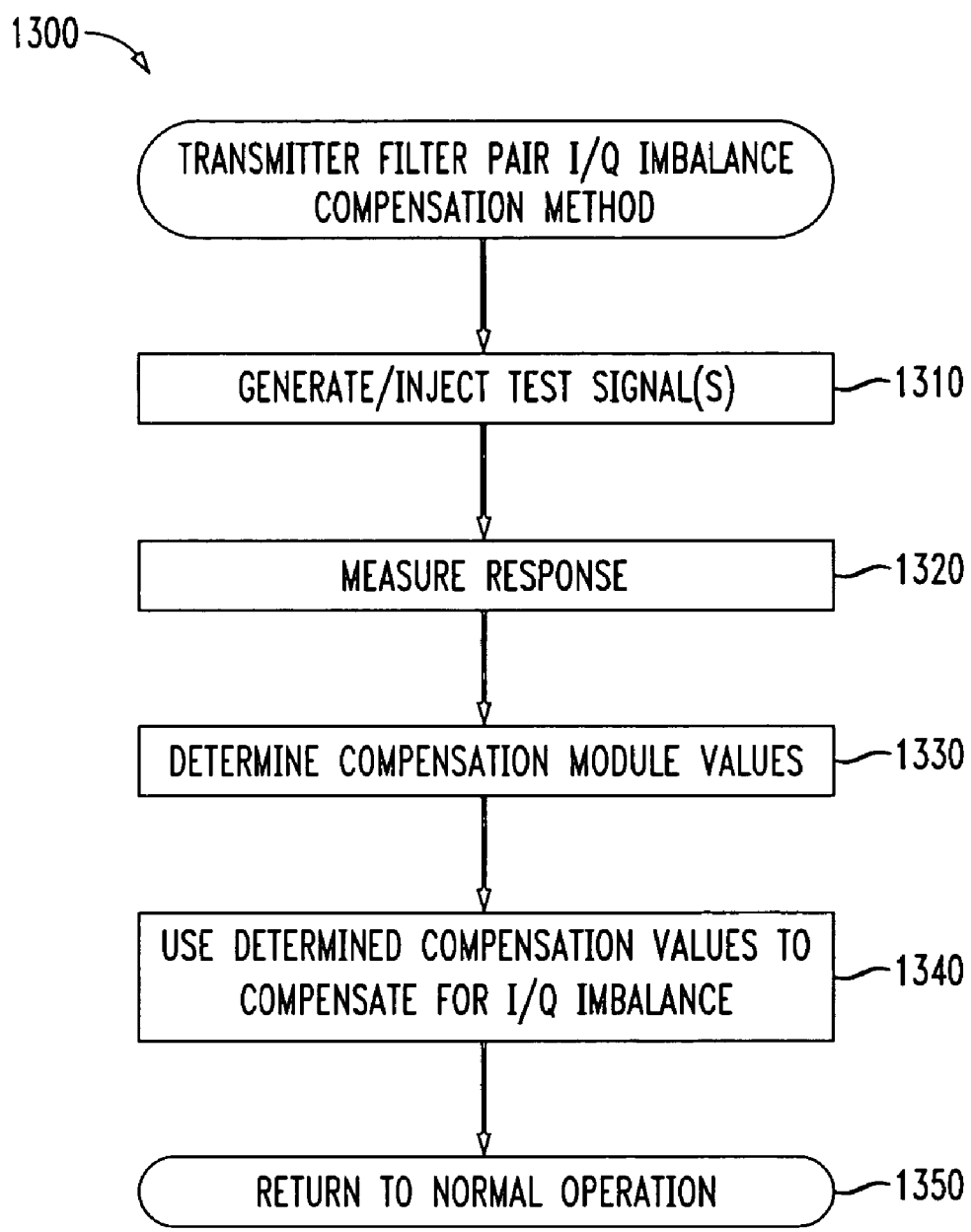
FIG. 13 is a flowchart of an exemplary transmitter filter pair I/Q imbalance compensation method in accordance with the present invention.

FIG. 13 is a flowchart 1300 illustrating an exemplary transmitter filter pair I/Q imbalance compensation method in accordance with the present invention. The test signal(s) are generated and injected into the filter chain (1310). The response to the injected test signals is measured (1320). Compensation module values are determined (1330). Next, the determined compensation values are used to compensate for I/Q imbalance (1340). The transmitter returns to normal operation (1350).

The acts of the flowchart 1300 of FIG. 13 shall now be discussed in more detail in the context of an exemplary transmitter LPF pair I/Q compensation operation in accordance with the methods of the present invention.

The compensation operation starts when the transmitter is configured in a filter leakage test mode. FIG. 9 represents an exemplary off-line filter leakage test mode configuration. Mode controller 938 has controlled the switching modules 910 and 920 to disconnect the mixer block from the LPFs 916, 918 and to disconnect the compensation module 904 from the DACs 912, 914. Mode controller 938 has controlled switching module 920 to connect LPF 916 to ADC 930 and LPF 918 to ADC 928 (solid line configuration).

Test signal(s) are generated by test signal generator 940 and injected in the filter chain (1310), and the response output is measured by the test output measurement means 934 using FFT 932 (1320).

Two exemplary techniques of the signal generation/injection and measurement 1310 and 1320) are described below. In the first approach, two digital test signals, each at a distinct frequency are sequentially generated/injected and measured. A first digital test signal (e.g., exemplary test signal:test$_D$ (f$_{Tg}$)) at a third frequency (f$_{Tg}$), 942, is generated and applied to the inputs of both transmitter DACs 912, 914. Then, the amplitudes of output signals t$_{T1A}$ and t$_{T2A}$ from ADCs 930, 928 are measured by the test output measurement means 934 obtaining |T$_{T1A}$(f$_{Tg}$)| and |T$_{T2A}$(f$_{Tg}$)|. Next, the inputs to the ADCs 928, 930 are switched (to the dotted line configuration) such that LPF 916 couples to ADC 928 while LPF 918 couples to ADC 930. This switching operation is performed so that data may be collected to mathematically remove the I/Q gain imbalance present in the ADC pair (928/930). ADC pair (928/930) is not in the normal operational transmitter chain (See FIG. 6), and thus it is desirable that ADC pair (928/930) I/Q imbalance not influence the determination of transmitter chain pre-distortion (correction) module coefficients. Next, the first digital test signal (test$_D$(f$_{Tg}$)) at the third frequency (f$_{Tg}$) 942 is generated and applied to the inputs of both transmitter DACs 912, 914. The amplitudes of output signals t$_{T1B}$ and t$_{T2B}$ from ADCs 928, 930 are measured by the test output measurement means 934 obtaining |T$_{T1B}$(f$_{Tg}$)| and |T$_{T2B}$(f$_{Tg}$)|. Next, a second digital test signal (e.g., exemplary test signal: test$_E$(f$_{Tp}$)) at a fourth frequency (f$_{Tp}$) 944 is generated and applied to the inputs of both transmitter DACS 912, 914. The test output measurement means 934 measures the phase of the output signals t$_{T1B}$ and t$_{T2B}$ from each of the ADCs 928, 930 using FFT 932, obtaining angle T$_{T1B}$(f$_{Tp}$), and angle T$_{T2B}$(f$_{Tp}$).

A second approach of the signal generation/injection and measurement operations (1310 and 1320) shall now be described. In the second approach, a digital test signal, with two distinct frequencies is generated by test output measurement means 934, injected into the DACs 912,914 and measured by the test output measurement means using FFT 932. A first digital test signal (e.g., exemplary test signal: test$_F$(f$_{Tg}$, f$_{Tp}$)) including a component at a third frequency (f$_{Tg}$) 942 and a component at a fourth frequency (f$_{Tp}$) 944 is generated and input to both transmitter DACs 912, 914. Next, the test output measurement means 934 measures the amplitude of output signals t$_{T1A}$ and t$_{T2A}$ at the third frequency (f$_{Tg}$) 942 and measures the phase of the output signals t$_{T1A}$ and t$_{T2A}$ at the fourth frequency (f$_{Tp}$) 944 using FFT 932, obtaining |T$_{T1A}$(f$_{Tg}$)|, |T$_{T2A}$(f$_{Tg}$)|, angle T$_{T1A}$(f$_{Tp}$), and angle T$_{T2A}$(f$_{Tp}$). Next, the inputs to the ADCs 928, 930 are switched (to the dotted line configuration) such that LPF 916 couples to ADC 928 while LPF 918 couples to ADC 930. Then, the first digital test signal (test$_F$(f$_{Tp}$,f$_{Tp}$)) including a component at a third frequency (f$_{Tg}$) 942 and a component at a fourth frequency (f$_{Tp}$) 944 is generated and input to the both transmitter DACs 912, 914. The amplitudes of the output signals t$_{T1B}$ and t$_{T2B}$ are measured by the test output measurement means 934 using FFT 932, obtaining |T$_{T1B}$(f$_{Tg}$)| and |T$_{T2B}$(f$_{Tg}$)|. This repeat application of the test signal and collection of a second set of measurements is performed in order to obtain sufficient data to remove the I/Q gain imbalance due to the ADCs 928, 930, elements not in the operational transmitter chain.

Next, compensation parameter determination means 936 determines a gain error value and a filter delay error value based upon the measurements (1330).

Compensation parameter determination means 936, determines a compensation gain value 908 using the amplitude measurements collected at the third frequency (f$_{Tg}$) 942 as described below. An estimated gain error at frequency (f$_{Tg}$) 942 is determined:

$$\hat{\delta G}(f_{Tg}) = \sqrt{\frac{T_{T2A}(f_{Tg})}{T_{T1A}(f_{Tg})} * \frac{T_{T2B}(f_{Tg})}{T_{T1B}(f_{Tg})}}.$$

A gain compensation parameter (1/δG) 908 is determined by module 936 where $\hat{\delta G} = \hat{\delta G}(f_{Tg})$.

Compensation parameter determination means 936, determines a compensation delay error value 906 using the phase measurements collected at the fourth frequency (f$_{Tp}$) 944 as described below. An estimated phase error: ($\hat{\delta P}$ (f$_{Tp}$)=−n/2+angle T$_{T2A}$(f$_{Tp}$)−angle T$_{T1A}$(f$_{Tp}$)) or ($\hat{\delta P}$ (f$_{Tp}$)=−n/2+angle T$_{T2B}$(f$_{Tp}$)−angle T$_{T1B}$(f$_{Tp}$))or $\hat{\delta P}$ (f$_{Tp}$)=−n/2+(angle T$_{T2A}$(f$_{Tp}$)−angle T$_{T1A}$(f$_{Tp}$)+angle T$_{T2B}$(f$_{Tp}$)−angle T$_{T1B}$(f$_{Tp}$))/2) at frequency f$_{Tp}$ 944 is determined. Next, compensation parameter determination means 936 determines a delay compensation parameter ($\hat{\delta P}/\omega_{Tp}$) 906 where $\hat{\delta P} = \hat{\delta P}(f_{Tp})$.

The determined transmitter I/Q gain and delay values (908, 906) are installed (loaded) in the I/Q filter compensation pre-distortion (correction) module 904 (1340).

The transmitter chain may then be returned to normal (e.g., on-line) operational mode (1350). Here, the mode controller 938 may direct the switching modules 910 and 920 to reconfigure the transmitter chain. An exemplary reconfigured transmitter chain is shown in FIG. 10. The gain and delay values installed in the compensation module 904, may remain and be used until another test signal compensation operation is performed. In some embodiments, the compensation operation of FIG. 13 may be performed once (e.g., at the factory prior to shipment). Alternatively, or in addition, the test signal compensation operation may be performed once during each power on cycle (e.g., at turn-on as part on an initialization sequence). Alternatively, or in addition, the test signal compensation operation may be performed intermittently during operations (e.g., once at power-on, occasionally or periodically during the operation at time intervals where the transmitter is not being utilized). In some embodiments, a re-tuning transmitter compensation operation may be initiated by an observed degradation in the quality of the received signal corresponding to transmissions from said transmitter.

Variations of the methods of the exemplary receiver I/Q compensation operation of FIG. 12 or the exemplary transmitter I/Q compensation operation of FIG. 13 are possible in accordance with the invention. For, example, the order of signal generation/injection and measurements (with respect to gain and phase test frequencies) may be varied. The switching point for interchanging the inputs to ADCs 928, 930 may be performed at different points in the testing sequence. In addition, two individual test signals each with a single test frequency at a different time may be grouped together and viewed as a single test signal, in accordance with the invention.

The selection of various real low pass filters for the I/Q receiver and/or transmitter chain shall now be discussed with respect to the I/Q compensation module of the present invention. A proposed method for I/Q frequency dependent error compensation, in accordance with the present invention, apriori designates and designs the correction module to a simple digital implementation using a gain coefficient and a delay coefficient. The expected gain and phase imbalance, for a specific real low pass filter pair may be identified based on an extensive statistical analysis. These statistical results may be used to evaluate whether the pair of filters has a relatively frequency-independent pass-band gain error and a relatively linear pass-band phase error (i.e., a delay). In other words, $$\delta G(\omega)\Big|_{\omega \in BW} = \delta G = \text{constant}$$

and $$\frac{\partial \delta P(\omega)}{\partial \omega}\Big|_{\omega \in BW} = \tau = \text{constant}$$

(Slope of the phase error vs frequency curve can be reasonably approximated by a straight line).

Figure 18:
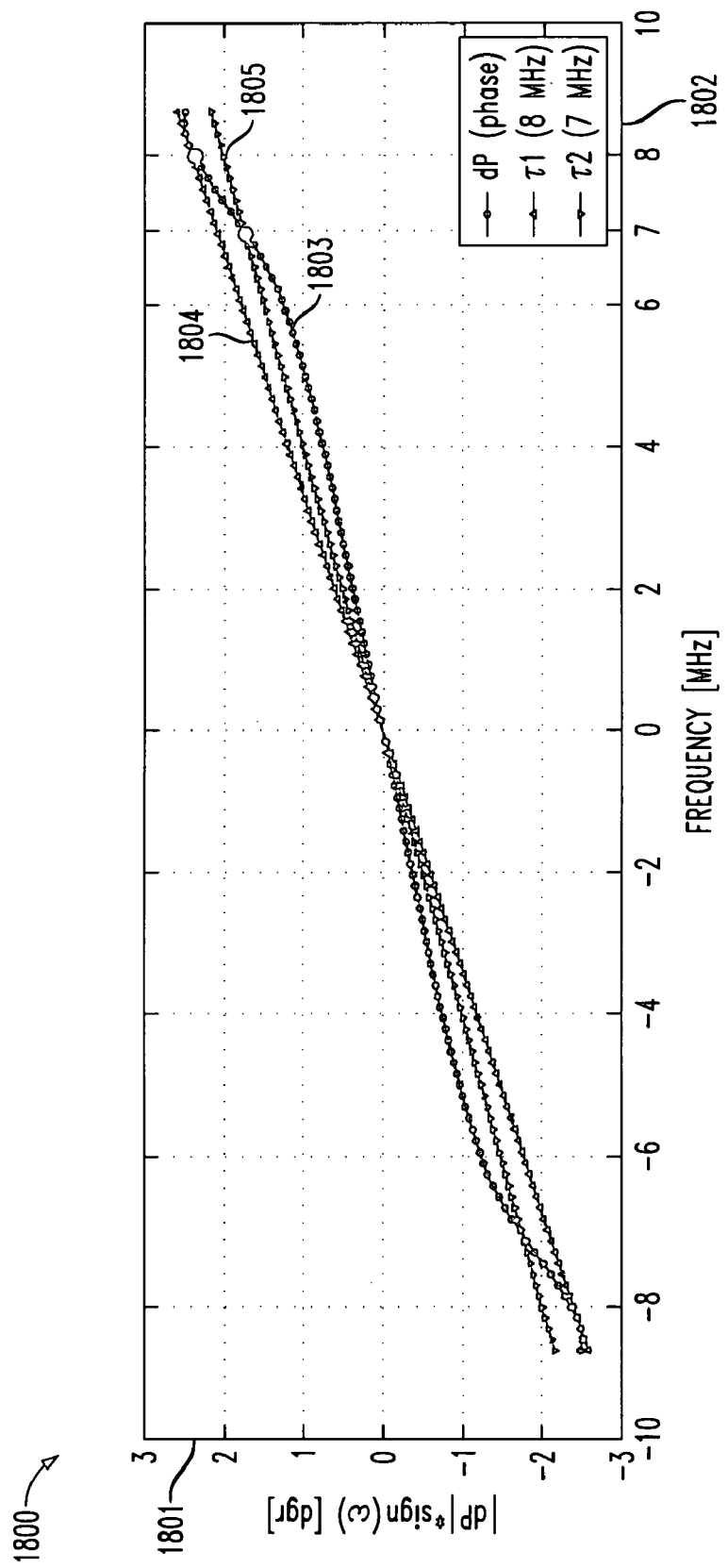
FIG. 18 shows estimation error of the linear approximation of phase imbalance.

FIG. 18 illustrates exemplary delay approximations of phase imbalance for an exemplary $7^{th}$ order Butterworth filter with an 8.8 MHz bandwidth. FIG. 18 includes a graph 1800 of phase [deg] on the vertical axis 1801 vs frequency on the horizontal axis 1802. Curve 1803 illustrates phase error due to I/Q phase imbalance as a function of frequency. Curve 1804 illustrates a compensation approximation model with a constant delay $\tau_1$ that may be obtained as a straight line approximation based on a phase measurement test frequency selection of 8 MHz. Curve 1805 illustrates a compensation approximation model with a constant delay $\tau_2$ that may be obtained as a straight line approximation based on a phase measurement test frequency selection of 7 MHz. Both $\tau_1*\omega$ and $\tau_2*\omega$ approximate $\delta P(\omega)$ reasonably well.

For filters, where these strict assumptions (described above) hold, the proposed I/Q compensation method of the present invention has the advantage that it provides a fast-estimation (non-iterative) and hardware-efficient compensation (correction) method. However, the proposed method uses these assumptions, so it is less effective for filters with different behavior.

Statistical evaluations indicate that a cascade-of-pole Butterworth filter ($7^{th}$ order transfer function with 8.8 MHz bandwidth) significantly benefits from the delay-based correction of the present invention. In order to check the validity of the proposed method for other filters, first, the same Butterworth transfer function was investigated for an implementation using a ladder topology. In addition, a 7th-order 0.5-dB ripple 8.8-MHz wide Chebyshev transfer function was investigated for both cascade-of-poles and ladder topologies.

Figure 14:
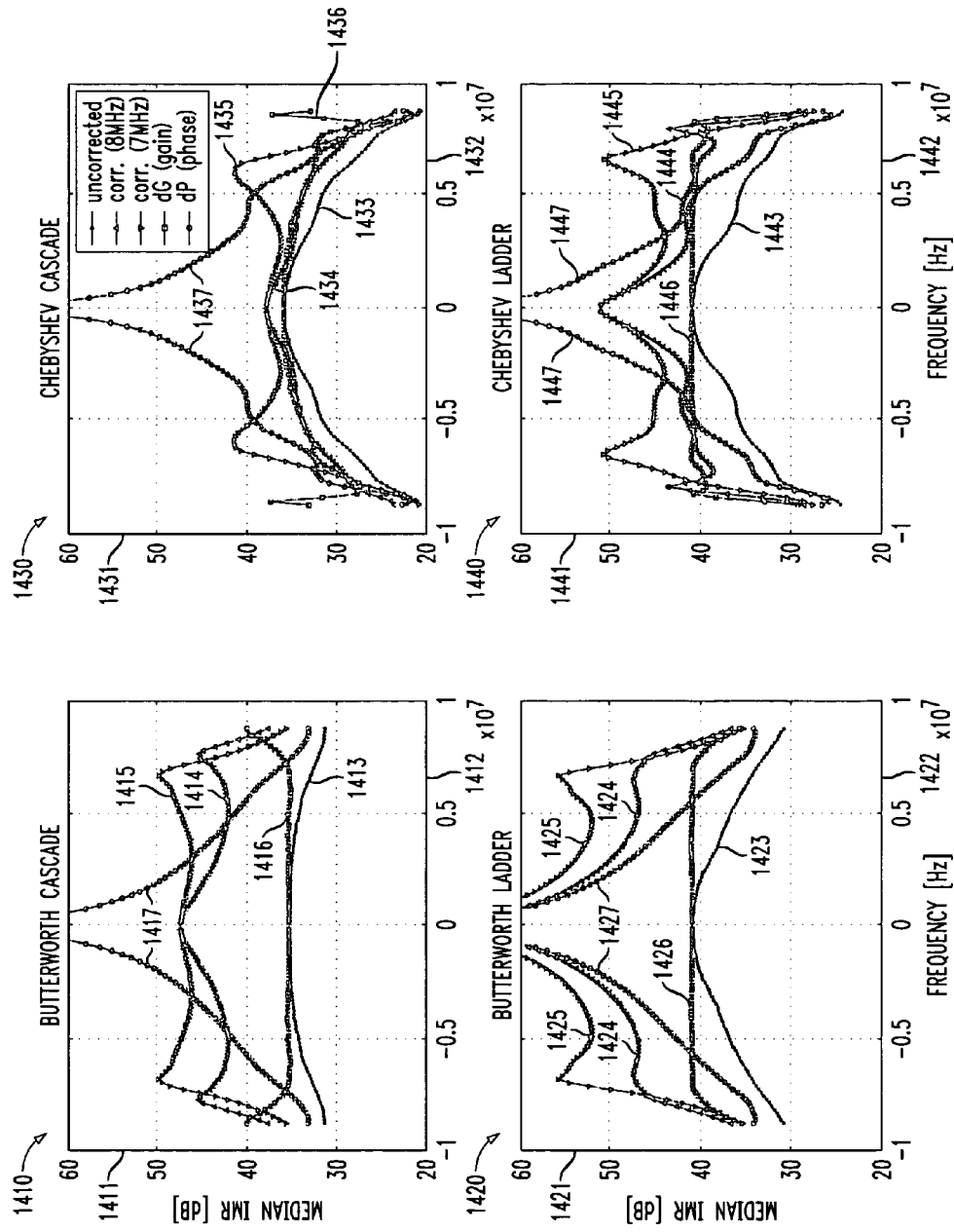
FIG. 14 shows statistical results for simulations of four exemplary filters.

FIG. 14 shows the frequency dependence of the uncompensated/compensated median IMR ($\omega$) and gain/phase errors based on a 2000-trial statistical analysis for the four filter types described above. Graph 1410 plots median IMR [dB] on vertical axis 1411 vs frequency on horizontal axis 1412 for the Butterworth cascade filter. Curve 1413 represents total uncorrected IMR ($\omega$); curve 1414 represents total corrected IMR ($\omega$) when a test frequency=8 MHz is used for the phase measurements; curve 1415 represents total corrected IMR ($\omega$) when a test frequency=7 MHz is used for the phase measurements; curve 1416 represents the gain component dG (gain) of the uncorrected IMR ($\omega$); curve 1417 represents the phase component dP (phase) of the uncorrected IMR ($\omega$).

Graph 1420 plots median IMR(dB) on vertical axis 1421 vs frequency on horizontal axis 1422 for the Butterworth ladder filter. Curve 1423 represents total uncorrected IMR ($\omega$); curve 1424 represents total corrected IMR ($\omega$) when a test frequency=8 MHz is used for the phase measurements; curve 1425 represents total corrected IMR ($\omega$) when a test frequency=7 MHz is used for the phase measurements; curve 1426 represents the gain component dG (gain) of the uncorrected IMR ($\omega$); curve 1427 represents the phase component dP (phase) of the uncorrected IMR ($\omega$).

Graph 1430 plots median IMR(dB) on vertical axis 1431 vs frequency on horizontal axis 1432 for the Chebyshev cascade filter. Curve 1433 represents total uncorrected IMR ($\omega$); curve 1434 represents total corrected IMR ($\omega$) when a test frequency=8 MHz is used for the phase measurements; curve 1435 represents total corrected IMR ($\omega$) when a test frequency=7 MHz is used for the phase measurements; curve 1436 represents the gain component dG (gain) of the uncorrected IMR ($\omega$); curve 1437 represents the phase component dP (phase) of the uncorrected IMR ($\omega$).

Graph 1440 plots median IMR(dB) on vertical axis 1441 vs frequency on horizontal axis 1442 for the Chebyshev ladder filter. Curve 1443 represents total uncorrected IMR ($\omega$); curve 1444 represents total corrected IMR ($\omega$) when a test frequency=8 MHz is used for the phase measurements; curve 1445 represents total corrected IMR ($\omega$) when a test frequency=7 MHz is used for the phase measurements; curve 1446 represents the gain component dG (gain) of the uncorrected IMR ($\omega$); curve 1447 represents the phase component dP (phase) of the uncorrected IMR ($\omega$).

Figure 15:
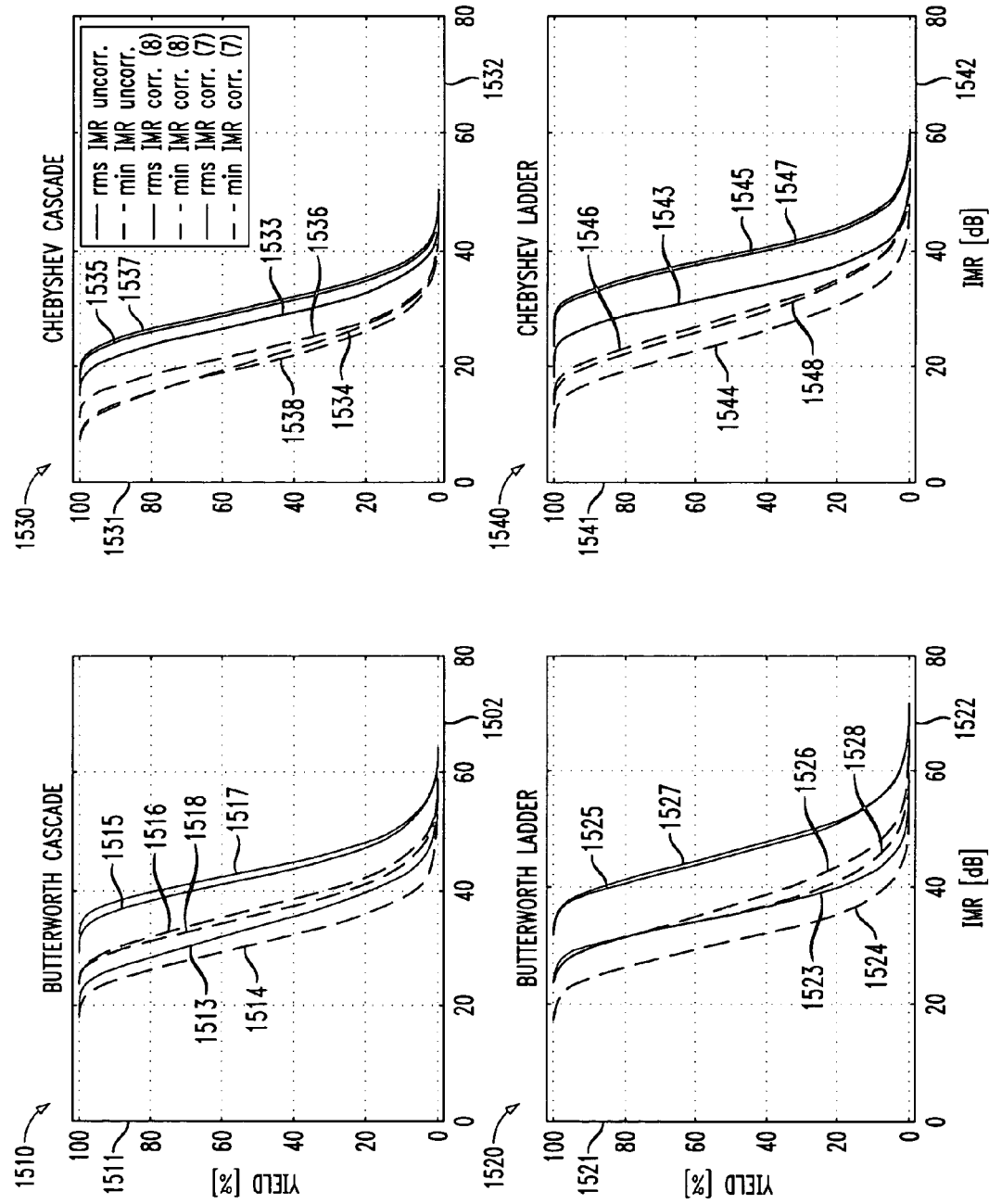
FIG. 15 shows yield curves corresponding to the statistical results for the four exemplary filters.

Yield curves are shown in FIG. 15 corresponding to each of the filters evaluated. Graph 1510 plots Yield (%) on vertical axis 1511 vs IMR(dB) on horizontal axis 1512 for the Butterworth cascade filter. Curve 1513 represents yields for rms of IMR (uncorrected); curve 1514 represents yields for minimum of IMR (uncorrected); curve 1515 represents yields for rms of IMR (corrected) when a test frequency of 8 MHz is used for the phase measurements; curve 1516 represents yields for minimum of IMR (corrected) when a test frequency of 8 MHz is used for the phase measurements; curve 1517 represents yields for rms of IMR (corrected) when a test frequency of 8 MHz is used for the phase measurements; curve 1518 represents yields for minimum of IMR (corrected) when a test frequency of 7 MHz is used for the phase measurements.

Graph 1520 plots Yield (%) on vertical axis 1521 vs IMR (dB) on horizontal axis 1522 for the Butterworth ladder filter. Curve 1523 represents yields for rms of IMR (uncorrected); curve 1534 represents yields for minimum of IMR (uncorrected); curve 1535 represents yields for rms of IMR (corrected) when a test frequency of 8 MHz is used for the phase measurements; curve 1526 represents yields for minimum of IMR (corrected) when a test frequency of 8 MHz is used for the phase measurements; curve 1527 represents yields for rms of IMR (corrected) when a test frequency of 8 MHz is used for the phase measurements; curve 1528 represents yields for minimum of IMR (corrected) when a test frequency of 7 MHz is used for the phase measurements.

Graph 1530 plots Yield (%) on vertical axis 1531 vs IMR (dB) on horizontal axis 1532 for the Chebyshev cascade filter. Curve 1533 represents yields for rms of IMR (uncorrected); curve 1534 represents yields for minimum of IMR (uncorrected); curve 1535 represents yields for rms of IMR (corrected) when a test frequency of 8 MHz is used for the phase measurements; curve 1536 represents yields for minimum of IMR (corrected) when a test frequency of 8 MHz is used for phase measurements; curve 1537 represents yields for rms of IMR (corrected) when a test frequency of 8 MHz is used for the phase measurements; curve 1538 represents yields for minimum of IMR (corrected) when a test frequency of 7 MHz is used for the phase measurements.

Graph 1540 plots Yield (%) on vertical axis 1541 vs IMR (dB) on horizontal axis 1542 for the Chebyshev ladder filter. Curve 1543 represents yields for rms of IMR (uncorrected); curve 1544 represents yields for minimum of IMR (uncorrected); curve 1545 represents yields for rms of IMR (corrected) when a test frequency of 8 MHz is used for the phase measurements; curve 1546 represents yields for minimum of IMR (corrected) when a test frequency of 8 MHz is used for IMR(corrected); curve 1547 represents yields for rms of IMR (corrected) when a test frequency of 8 MHz is used for the phase measurements; curve 1548 represents yields for minimum of IMR (corrected) when a test frequency of 7 MHz is used for IMR (corrected).

Figure 16:
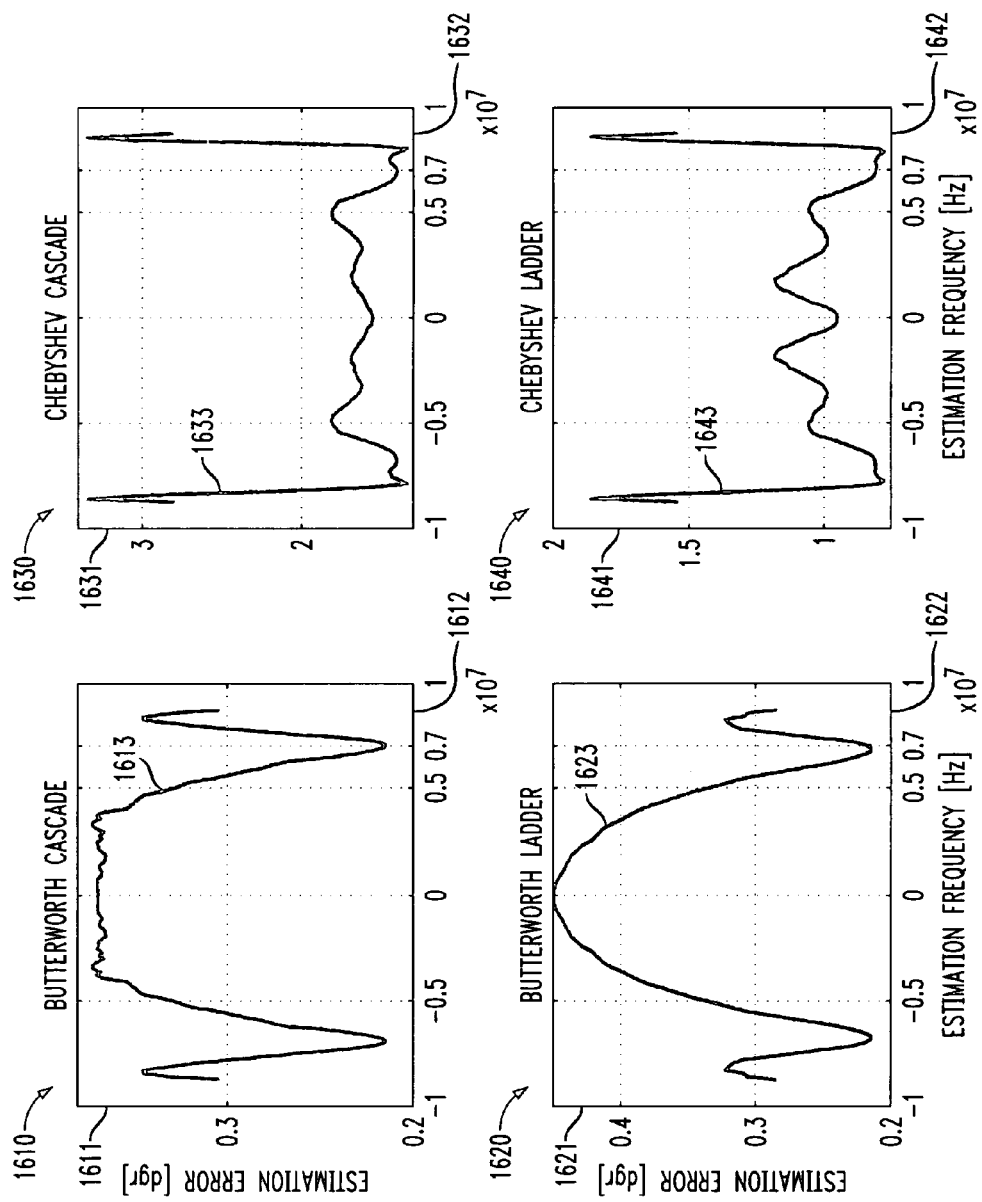
FIG. 16 shows estimation error vs estimation frequency for the four exemplary filters.

Estimation error (dgr) vs estimation frequency is shown for each of the four filters evaluated in FIG. 16. Graph 1610 shows a curve 1613 plotting estimation error (dgr) on the vertical axis 1611 vs estimation frequency on the horizontal axis 1612 for the Butterworth cascade filter. Graph 1620 shows a curve 1623 plotting estimation error (dgr) on the vertical axis 1621 vs estimation frequency on the horizontal axis 1622 for the Butterworth ladder filter. Graph 1630 shows a curve 1633 plotting estimation error (dgr) on the vertical axis 1631 vs estimation frequency on the horizontal axis 1632 for the Chebyshev cascade filter. Graph 1640 shows a curve 1643 plotting estimation error (dgr) on the vertical axis 1641 vs estimation frequency on the horizontal axis 1642 for the Chebyshev ladder filter. The optimal $f_p$ frequency (the test frequency to use for phase measurements) may be determined based on FIG. 16.

Table 1700 of FIG. 17 summaries comparison results for the four filters evaluated for a rms IMR (dB) with phase measurement test frequency $f_p$=7 MHz and gain measurement test frequency $f_g$=5 MHz.

The uncompensated IMR (ω) results will be discussed first. Using Butterworth over Chebyshev transfer functions improves the amount of the rms IMR by about 3-5 dBs (FIG. 17). Also, the use of a ladder topology yields to about 2-4-dB better rms IMR than cascade-of-poles topology. This, indeed, confirms the reduced sensitivity to circuit element mismatch of ladder filters. Interestingly, the gain error of the cascade-of-poles Chebyshev gradually bends over frequency (See curve 1436 of FIG. 14), so the constant gain-error assumption does not hold well for this filter. However, the gain error of a ladder Chebyshev flattens out except a sharp increase of about 10 dB close to the pass-band edge (See curve 1446 of FIG. 14). Butterworth filters show an approximately flat gain-error response with a slight bend near the pass-band edge (See curves 1416, 1426 of FIG. 14).

FIG. 16 shows that the best phase-error estimation occurs for $f_p$ of about 7 MHz for the four filters. Although there is a global minima at about 8 MHz for the Chebyshev transfer function, the local minima at about 7 MHz is not significantly higher and, more importantly, is much flatter. Therefore, $f_p$=7 MHz should be used for each of the four filters for "best" rms phase-error estimation. Note that Butterworth filters introduce roughly 5×less rms estimation error for $f_p$=7 MHz (i.e., ~0.2° for Butterworth versus ~1° for Chebyshev, FIG. 16). Therefore, Butterworth filters are much better candidates for delay-based compensation, of the present invention, due to their maximally-flat response than their ripply, but more selective, Chebyshev counterparts.

The effectiveness of the proposed compensation can be determined from FIGS. 14, 15 and 17. Clearly, a pair of ladder Butterworth filters is the best choice from the four candidate filters evaluated. Ladder Butterworth filters are the least affected by circuit-element mismatch to start with (i.e., uncorrected median rms IMR=35.2 dB, FIG. 17), and they can be the most effectively corrected by the proposed delay-based correction of the present invention (i.e., corrected median rms IMR=46.1 dB). Both the cascade-of-poles Butterworth and ladder Chebyshev filters significantly benefit from the correction, which improves their performance by about 6-10 dB (FIG. 17). The approximately 2-dB improvement for a cascade-of-poles Chebyshev filter shows less improvement.

To ease the analog filtering requirements, in accordance with the invention, oversampling may be used in the TX and/or RX chain. In that case, the filter's bandwidth may be slightly increased by, e.g., 10% or 20%, at the expense of some selectivity loss. From the results in FIG. 14, one may conclude that opening up the filter has the advantage that it reduces the uncompensated I/Q imbalance affecting the actual signal. In addition, the compensated IMR improves even more.

For example, the compensated median rms IMR of ladder Butterworth filters increases by 4.9 dB and 8.2 dB for 10% and 20% bandwidth increase, respectively, while the uncorrected median rms IMR gets improved by only 1.7 dB for the 20% bandwidth stretching (FIG. 14). Both Chebyshev filters show about 6-dB compensated and 3-dB uncompensated IMR improvement for 20% bandwidth increase. These values are 3-dB and 0.7 dB for the cascade-of-pole Butterworth case.

Based on analysis and in accordance with the methods of the invention, a "backward thinking" filter-design methodology may be used. A system-level designer may consider the I/Q imbalance as a constraint (like the stop-band attenuation, bandwidth or group delay) in choosing the transfer function and the topology. By making a choice which is apriori favorable for the proposed delay-based compensation of the present invention (e.g., choosing a ladder Butterworth filter), a simple and effective I/Q compensation, in accordance with the invention, is possible. In contrast, when the I/Q-imbalance constraint is ignored, laborious, complicated and/or costly known frequency-dependent I/Q correction schemes (previously referenced) may be required.

Although the invention has been described in the context of a low-pass real filter pair used for I/Q compensation, the method of the present invention may be also applicable to pairs of band-pass real filters. In such applications, the test frequency used to tune the compensation module to obtain the gain coefficient may selected near the center of the band-pass region. In addition the present invention may be used in applications other than I/Q receivers, transmitters, and/or transceivers which utilize filter pairs and may benefit from the compensation methods of the present invention.

In some embodiments various features and/or elements of the present invention are implemented using modules. Such modules may be implemented using software, hardware or a combination of software and hardware. Some of the above described methods can be implemented using machine executable instructions, such as software, included in a machine readable medium such as a memory device, to control a machine, with or without additional hardware, to implement all or portions of the above described methods, e.g., in one or more elements. Accordingly, among other things, the present invention is directed to a machine-readable medium including machine executable instructions for causing a machine, e.g., processor and associated hardware, to perform one or more of the steps of the above-described method(s).

What is claimed is:

1. A method for determining a gain error estimate and a delay error estimate in a pair of filters comprising:
    a) applying a test signal to an input of both filters;
    b) measuring an output signal at the output of each filter;
    c) determining the gain error at a first frequency and a phase error at a second frequency;
    d) determining the delay error estimate using the determined phase error, wherein the delay error estimate is constant with frequency;

e) compensating for the determined delay error using a delay function, wherein, the delay function is substantially constant with frequency; and f) compensating for the determined gain error using a gain function, wherein the gain function is substantially constant with frequency.

2. The method of claim 1, wherein the pair of filters are IQ filters.

3. The method of claim 1, wherein the first frequency is different from the second frequency.

4. The method of claim 1, wherein the first frequency is less than the second frequency.

5. The method of claim 1, wherein the first frequency is well within a pass-band of the pair of filters.

6. The method of claim 1 wherein the first frequency is at approximately a pass band center and wherein the pair of filters are low pass filters.

7. The method of claim 1 wherein the first frequency is at approximately DC and wherein the pair of filters are low pass filters.

8. The method of claim 1 wherein the first frequency is at approximately a band-pass center and wherein the pair of filters are band-pass filters.

9. The method of claim 1 wherein the second frequency is in a transition region of a cutoff frequency of the filters.

10. The method of claim 1, wherein the second frequency is at a point in the upper portion of the transition region having 0-20 dB attenuation from an average value.

11. The method of claim 1, wherein the second frequency is at a point in the upper portion of the transition region having a 0-3 dB attenuation from an average value.

12. The method of claim 1, wherein the filters are low-pass filters.

13. The method of claim 1, wherein the test signal is a multi tone signal including the first and second frequencies.

14. The method of claim 1, wherein the test signal includes the first tone at a first time and the second tone at a second time other than the first time.

15. The method of claim 1, wherein determining the delay error estimate uses the determined phase error estimate at the second frequency.

16. The method of claim 1, wherein the second frequency corresponds to a minimum root mean square value of the phase error between a statistically estimated model for the filter and a constant delay model for the filter over the bandpass of the filter.

17. The method of claim 1, wherein the second frequency improves the delay compensation near the bandpass edge.

18. The method of claim 1 wherein, the pair of filters are part of a receiver chain.

19. The method of claim 18, wherein the determined gain error at a first frequency includes gain error from an analog to digital converter pair in the receiver chain in addition to gain error due to the pair of filters.

20. The method of claim 1, wherein the pair of filters are part of a transmitter chain.

21. The method of claim 20, wherein the determined gain error at a first frequency includes gain error from a digital to analog converter pair in the transmitter chain in addition to gain error due to the pair of filters.

22. The method of claim 20, wherein the act of measuring an output signal at the output of each filter includes providing the output of each of the pair of filters to a corresponding one of a pair of analog to digital converters and measuring an output at each of the analog to digital converters.

23. The method of claim 22, further comprising i) providing the output of each the pair of filters to the other one of the pair of analog to digital converters; and ii) again measuring the output signal at the output of each of the analog to digital converters.

24. The method of claim 23, wherein determining the gain error at a first frequency removes a contribution from the analog to digital converter pair.

25. Apparatus for use in determining a gain error estimate and a delay error estimate in a pair of filters comprising:

a) a signal generator for applying a test signal to an input of each of the filters;

b) means for measuring an output signal at the output of each of the filters;

c) means for determining the gain error at a first frequency and a phase error at a second frequency;

d) means for determining the delay error estimate using the determined phase error, wherein the delay error estimate is constant with frequency;

e) means for compensating for the determined delay error using an implementation of a delay function, wherein, the delay function is substantially constant with frequency; and f) means for compensating for the determined gain error using an implementation of a gain function, wherein the gain function is substantially constant with frequency.

26. The apparatus of claim 25, wherein the pair of filters are IQ filters.

27. The apparatus of claim 25, wherein the first frequency is different from the second frequency.

28. The apparatus of claim 25, wherein the first frequency is less than the second frequency.

29. The apparatus of claim 25, wherein the first frequency is well within a pass-band of the pair of filters.

30. The apparatus of claim 25 wherein the first frequency is at approximately a pass band center and wherein the pair of filters are low pass filters.

31. The apparatus of claim 25 wherein the first frequency is at approximately DC and wherein the pair of filters are low pass filters.

32. The apparatus of claim 25 wherein the first frequency is at approximately a band-pass center and wherein the pair of filters are band-pass filters.

33. The apparatus of claim 25 wherein the second frequency is in a transition region of a cutoff frequency of the filters.

34. The apparatus of claim 25, wherein the second frequency is at a point in the upper portion of the transition region having 0-20 dB attenuation from an average value.

35. The apparatus of claim 25, wherein the second frequency is at a point in the upper portion of the transition region having a 0-3 dB attenuation from an average value.

36. The apparatus of claim 25, wherein the filters are low-pass filters.

37. The apparatus of claim 25, wherein the test signal is two-tone signal including the first and second frequencies.

38. The apparatus of claim 25, wherein the test signal includes the first tone at a first time and the second tone at a second time other than the first time.

39. The apparatus of claim 25, wherein determining the delay error estimate uses the determined phase error estimate at the second frequency.

40. The apparatus of claim 25, wherein the second frequency corresponds to a minimum root mean square value of a phase error between a statistically estimated model for the filter and a constant delay model for the filter over the bandpass of the filter.

41. The apparatus of claim 25, wherein the second frequency improves the delay compensation near the bandpass edge.

42. The apparatus of claim 25 wherein, the pair of filters are part of a receiver chain.

43. The apparatus of claim 42, wherein the determined gain error at a first frequency includes gain error from an analog to digital converter pair in the receiver chain in addition to gain error due to said pair of filters.

44. The apparatus of claim 43, wherein the receiver chain is part of a transceiver and wherein the generator for applying a test signal includes a digital to analog converter which is part of a transmitter chain in said transceiver.

45. The apparatus of claim 25, wherein the pair of filters are part of a transmitter chain.

46. The apparatus of claim 45, wherein the determined gain error at a first frequency includes gain error from a digital to analog converter pair in the transmitter chain in addition to gain error due to said pair of filters.

47. The apparatus of claim 25, wherein the means for measuring an output signal at the output of each filter includes a pair of analog to digital converters, means for providing the output of each of the pair of filters to a corresponding one of the pair of analog to digital converters, and means for measuring an output at each of the analog to digital converters.

48. The apparatus of claim 47, further comprising
i) switching means for providing the output of each of the pair of filters to the other one of the pair of analog to digital converters; and
ii) measuring means for again measuring the output signal at the output of each of the analog to digital converters.

49. The apparatus of claim 48, wherein the means for determining the gain error at a first frequency removes a contribution from the analog to digital converter pair.

50. The apparatus of claim 47, wherein the pair of filters is part of a transmitter chain, the pair of analog to digital converters is part of a receiver chain, and the receiver and transmitter chains are part of a transceiver.

51. The apparatus of claim 25, wherein the means for compensating for the determined delay error and the means for compensating the determined delay error are included in a compensation module in series with said filter pair.

52. The apparatus of claim 25, wherein the compensation module is a digital implementation and precedes a digital to analog converter pair and the filter pair in a transmitter chain.

53. The apparatus of claim 25, wherein the compensation module is a digital implementation and is situated downstream to said filter pair and an analog to digital converter pair in a receiver chain.

54. The apparatus of claim 25, wherein the apparatus is part of a mobile communications device.

55. Apparatus for use in compensating I/Q imbalance in a low pass filter pair in at least one of a receiver, a transmitter, and a transceiver, using a delay error and a gain error determined using a test system including:
a generator for applying a test signal to the inputs of the low path filter pair;
means for measuring an output signal at the output of each filter in the low pass filter pair;
means for determining the gain error at a first frequency and a phase error at a second frequency; and
means for determining the delay error estimate using the determined phase error, wherein the delay error estimate is constant with frequency, said apparatus comprising:
a) means for compensating for the determined delay error using an implementation of a delay function, wherein, the delay function is substantially constant with frequency; and
b) means for compensating the determined gain error using an implementation of a gain function, wherein the gain function is substantially constant with frequency.

56. The apparatus of claim 55, wherein the at least one of a receiver, a transmitter, and a transceiver is part of a mobile communications device.

57. A method for determining a gain error estimate and a delay error estimate in a pair of filters comprising:
a) applying a test signal to an input of both filters;
b) measuring an output signal at the output of each filter;
c) determining the gain error at a first frequency and a phase error at a second frequency; and
d) determining the delay error estimate using the determined phase error;
wherein the delay error estimate is constant with frequency; and
wherein the pair of filters are part of a transmitter chain.

58. The method of claim 57, wherein the determined gain error at a first frequency includes gain error from a digital to analog converter pair in the transmitter chain in addition to gain error due to the pair of filters.

59. The method of claim 57, wherein the act of measuring an output signal at the output of each filter includes providing the output of each of the pair of filters to a corresponding one of a pair of analog to digital converters and measuring an output at each of the analog to digital converters.

60. The method of claim 59, further comprising providing the output of each the pair of filters to the other one of the pair of analog to digital converters; and again measuring the output signal at the output of each of the analog to digital converters.

61. The method of claim 60, wherein determining the gain error at a first frequency removes a contribution from the analog to digital converter pair.

62. Apparatus for use in determining a gain error estimate and a delay error estimate in a pair of filters comprising:
a) a signal generator for applying a test signal to an input of each of the filters;
b) means for measuring an output signal at the output of each of the filters;
c) means for determining the gain error at a first frequency and a phase error at a second frequency; and
d) means for determining the delay error estimate using the determined phase error,
wherein the delay error estimate is constant with frequency, and
wherein the pair of filters are part of a transmitter chain.

* * * * *